United States Patent [19]

Tanimizu et al.

[11] Patent Number: 5,255,329
[45] Date of Patent: Oct. 19, 1993

[54] HIGH-SPEED FAULT DETECTING METHOD AND APPARATUS

[75] Inventors: Katsuyuki Tanimizu, Hachioji; Shinichi Meguro, Numabukuro; Akira Ishii, Tokyo, all of Japan

[73] Assignee: Nippon Telegraph and Telephone Corporation, Tokyo, Japan

[21] Appl. No.: 334,102
[22] PCT Filed: Aug. 9, 1988
[86] PCT No.: PCT/JP88/00787
   § 371 Date: Mar. 29, 1989
   § 102(e) Date: Mar. 29, 1989
[87] PCT Pub. No.: WO89/01669
   PCT Pub. Date: Feb. 23, 1989

[30] Foreign Application Priority Data

Aug. 13, 1987 [JP] Japan .................. 62-200957
Aug. 8, 1988 [JP] Japan .................. 63-196110

[51] Int. Cl.⁵ .................................. G06K 9/00
[52] U.S. Cl. .............................. 382/8; 382/17; 382/30; 382/33; 358/101; 358/106
[58] Field of Search ............ 392/8, 30, 34, 33, 57, 392/17; 358/101, 106, 107

[56] References Cited

U.S. PATENT DOCUMENTS

| | | | |
|---|---|---|---|
| 4,644,584 | 2/1987 | Nagashima et al. | 382/34 |
| 4,648,053 | 3/1987 | Fridge | 382/30 |
| 4,742,556 | 3/1988 | Davis, Jr. et al. | 382/30 |
| 4,841,473 | 6/1989 | DePaul | 382/34 |
| 4,872,203 | 10/1989 | Asai et al. | 382/30 |
| 4,893,346 | 1/1990 | Bishop | 382/30 |

Primary Examiner—Joseph Mancuso
Attorney, Agent, or Firm—Ladas & Parry

[57] ABSTRACT

In appearance inspection for a printed image, image data without a fault or image data in which a fault is corrected is selected as a reference image, and a table having, as its elements, flags in a number corresponding to the number of levels of an image for each pixel of the reference image is prepared. An index space is formed by a set of tables of all the pixels, and a reference pattern is formed by turning on the flags in the space. The flags in the index space are inspected and determined once for each pixel in accordance with attribute values of an image to be inspected. Setting of an allowable range for inspection is performed as pre-processing before flag propagation processing for turning on flags within the allowable range in the index space is performed. The flag is not limited to a binary one having values of ON and OFF but may be a multivalue one. The index space can be compressed by expressing flags by a hierarchical structure utilizing image data characteristics. By setting the reference image and the index space in a relationship other than a one-to-one correspondence, X and Y sizes or a level axis of the index space can be reduced.

21 Claims, 22 Drawing Sheets

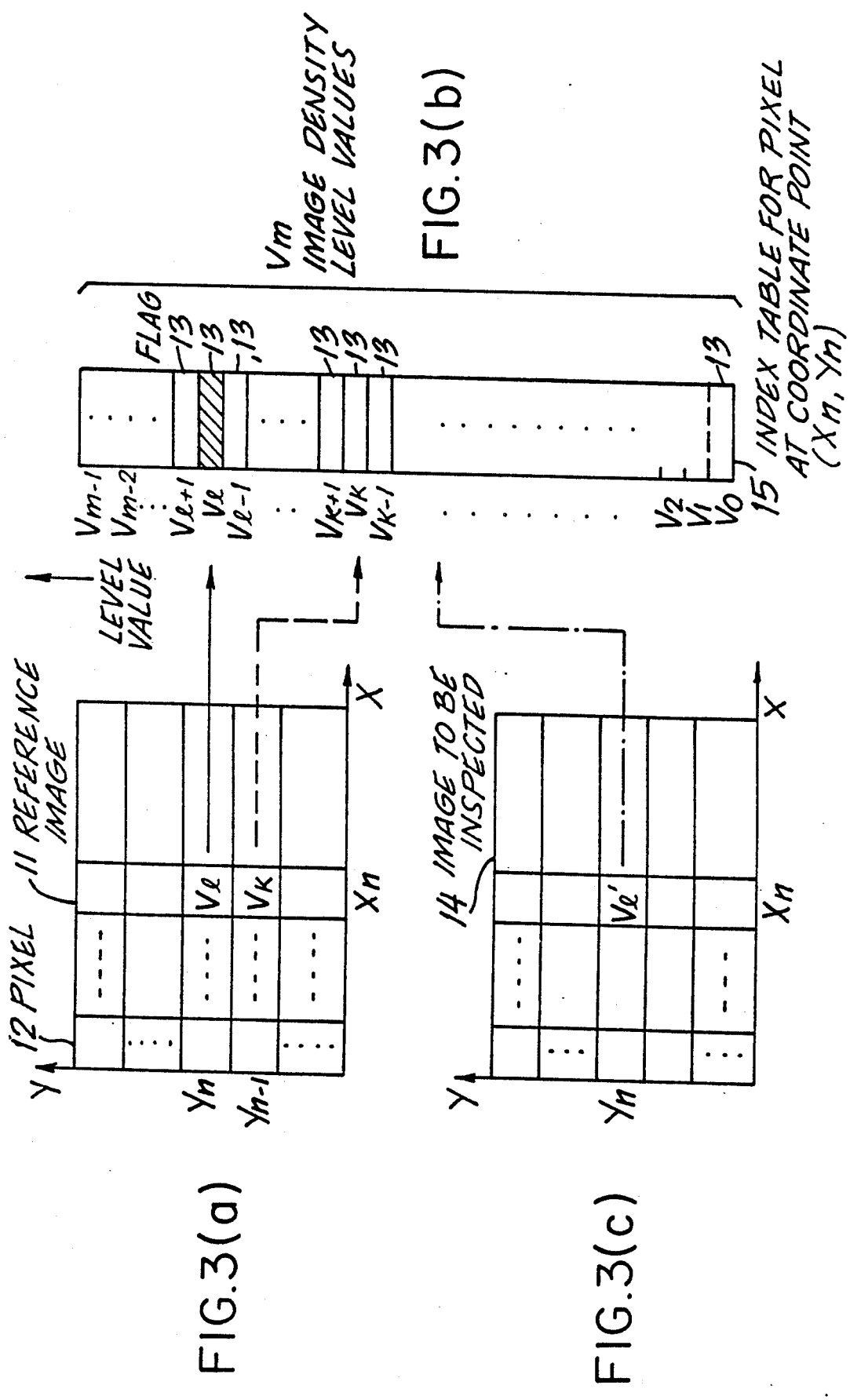

FIG. 3(d)

FIG. 4(a)
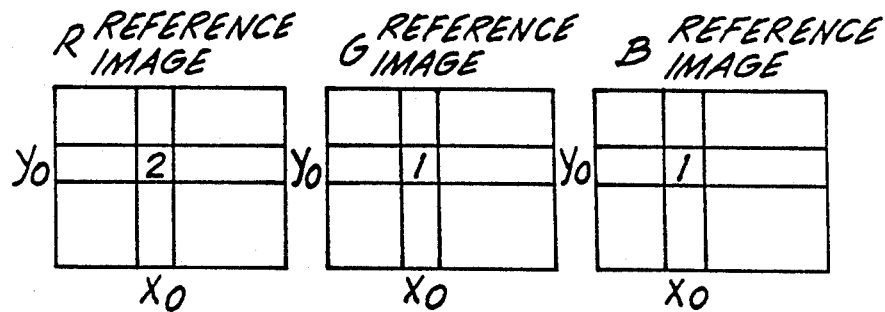
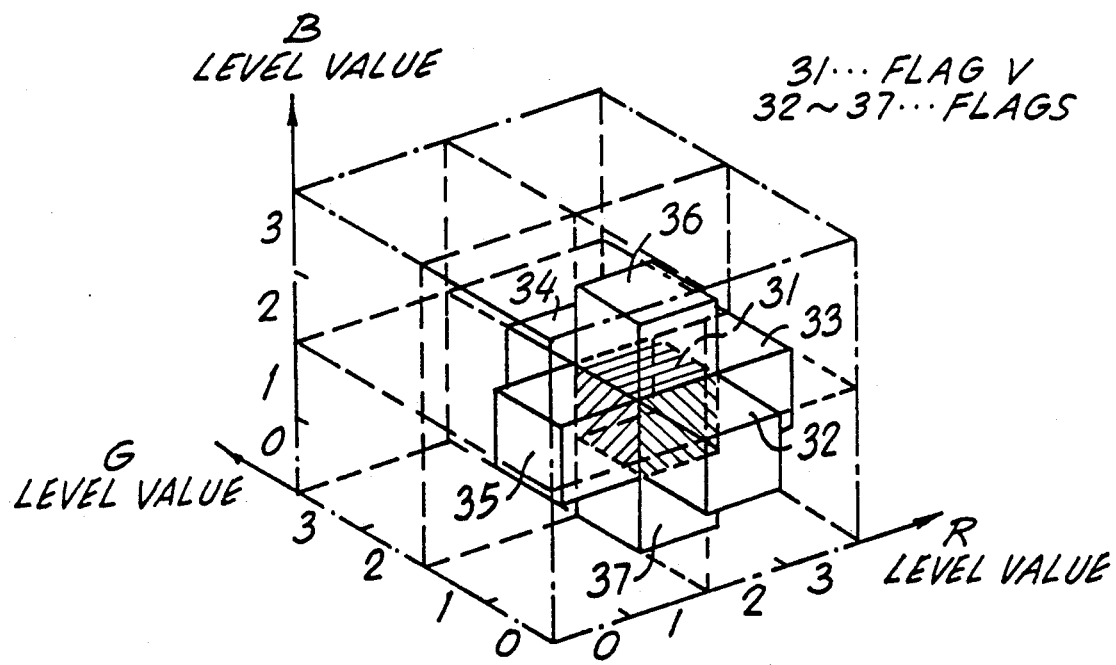
FIG. 4(b)

FIG. 5(b)

BIT NUMBER  7 6 5 4 3 2 1 0
HIERARCHICAL LEVEL 1 | 0 | 0 | 1 | 0 | 1 | 0 | 1 | 1 |

HIERARCHICAL LEVEL 2
FLAG AREA BIT NUMBER  7 6 5 4 3 2 1 0

| | 7 | 6 | 5 | 4 | 3 | 2 | 1 | 0 |
|---|---|---|---|---|---|---|---|---|
| 0 = | 1 | 0 | 0 | 0 | 0 | 0 | 0 | 0 |
| 1 = | 1 | 1 | 0 | 0 | 0 | 1 | 0 | 0 |
| 3 = | 0 | 0 | 0 | 1 | 0 | 0 | 0 | 0 |
| 5 = | 0 | 0 | 0 | 0 | 0 | 1 | 0 | 0 |

CORRESPONDING BIT NUMBER OF HIERARCHICAL LEVEL 1

FIG. 5(c)

| BIT NO. | R | G | B |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

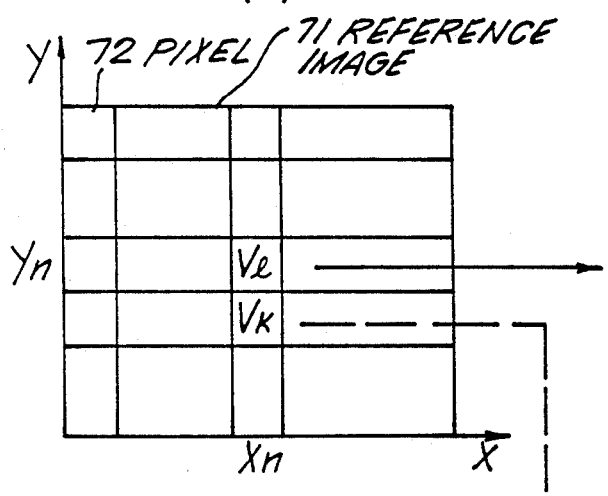

FIG. 8

HIERARCHICAL LEVEL 1

BIT NUMBER  7 6 5 4 3 2 1 0

| 0 | 0 | 1 | 0 | 1 | 0 | 1 | 1 |

HIERARCHICAL LEVEL 2

FLAG AREA BIT NUMBER  7 6 5 4 3 2 1 0

CORRESPONDING BIT NUMBER IN HIERARCHICAL LEVEL 1

| | 7 | 6 | 5 | 4 | 3 | 2 | 1 | 0 |
|---|---|---|---|---|---|---|---|---|
| 0: | 85 | 0 | 0 | 0 | 0 | 0 | 0 | 0 |
| 1: | 80 | 100 | 0 | 70 | 0 | 95 | 0 | 0 |
| 3: | 0 | 0 | 0 | 75 | 0 | 0 | 0 | 0 |
| 5: | 0 | 0 | 0 | 0 | 0 | 90 | 0 | 0 |

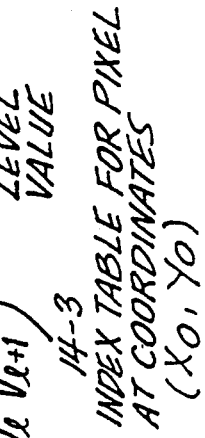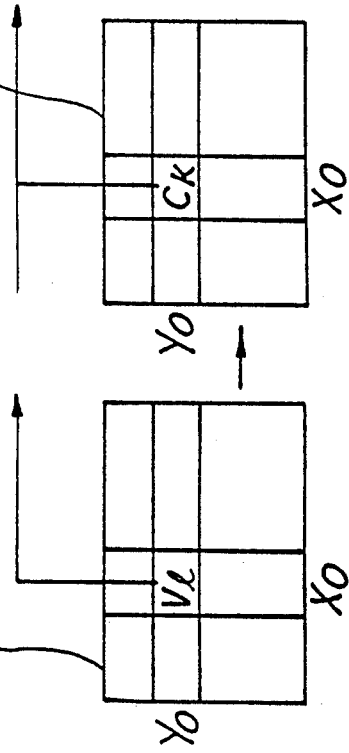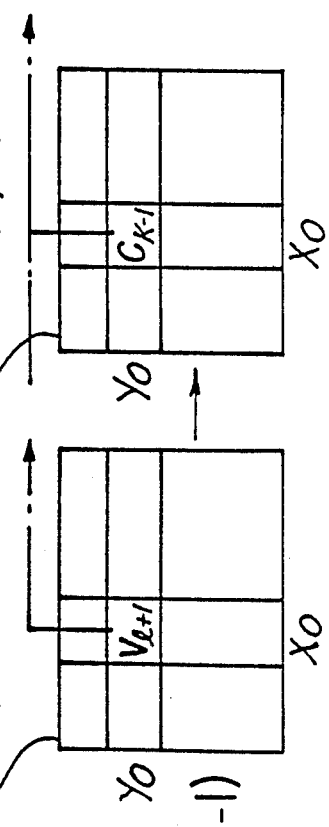

1/2

2/2

1/3

2/3

3/3

HIGH-SPEED FAULT DETECTING METHOD AND APPARATUS

TECHNICAL FIELD

The present invention relates to a method of automatically detecting a fault of an image to be inspected at high speed as flexibly as a visual inspection in a printed image appearance inspection and to an apparatus for carrying out the method.

BACKGROUND ART

In a conventional printed image appearance inspection using image processing techniques, a printing fault is detected by a "pixel pair comparing method" of comparing corresponding pixels of a reference image and an image to be inspected.

In general, when an image to be inspected is to be imaged and input by a camera, a small level variation is produced due to a positional difference caused by an imaging system, noise of the imaging system or a brightness fluctuation of illumination light. Therefore, in the above simple pixel pair comparing method, a noncoincidence between pixel values is determined by this small level variation. As a result, data which is originally not defective is processed as defective data. In order to prevent such pseudo fault detection, in a conventional fault detecting method, a level value of each pixel of an image to be inspected is compared with those of pixels located within a predetermined range close to a corresponding pixel in a reference image. In this case, if a pixel having a level difference falling within an allowable range is present in the predetermined range of the corresponding pixel in the reference image, it is determined to be normal. Otherwise, the pixel is determined to be defective. This method is called close analogous pixel searching processing [reference literature: Masuda et al., "Printing Quality Inspection System", Mitsubishi Heavy Industries, Ltd. Technical Report, Vol. 23, No. 2, (1986-3), PP. 248 to 252].

In the above conventional fault detecting method, however, if a positional difference allowable amount of input data is $\pm n$ pixels in both X- and Y-axis directions, a level of each pixel of an object to be inspected must be collated with those of $(2n+1)^2$ pixels in a reference image. That is, a calculation amount is increased in an order of a square with respect to an increase in positional difference allowable value. The number n is practically at least two or more, and therefore level collation must be performed 25 times or more for each pixel. In addition, if a level variation is allowed and allowable levels of level values differ from each other, allowable amount setting must be checked for each pixel of image data having a large number of pixels, resulting in an increase in processing amount. Also, in order to perform an inspection as flexible as a visual inspection, an allowable limit of a printing distortion such as thickening/thinning of a character must be additionally taken into consideration, and therefore cumbersome processing in which a variety of allowable conditions are referred to must be performed. As a result, since a processing amount is increased, a high-speed fault inspection cannot be performed.

In the above conventional fault detecting method, a processing speed can be increased within a certain range by reducing the size of image data or processing all pixels under the same allowable amount conditions. In this case, however, a resolution of an image or a flexibility for a determination reference is degraded to make it difficult to detect a fault with high precision.

SUMMARY OF THE INVENTION

It is an object of the present invention to provide a method and apparatus which eliminate the above conventional drawbacks, i.e., which can perform fault detection/determination processing at high speed even when a mechanical positional difference produced upon inputting of an image to be inspected, a small positional difference of a pixel due to a printing distortion, or a level variation in pixel caused by a disturbance is allowed and complicated allowable conditions are set for each pixel.

The present invention has, for each pixel, a memory table including, as its elements, flags of binary values (ON, OFF) in a number corresponding to the number of density levels of an image, and a set of memory tables of all the pixels is defined as an index space. It is another object of the present invention to compress a memory capacity in the index space, thereby reducing the memory capacity per pixel.

It is still another object of the present invention to allow each flag in the index space to take not only binary values but also multivalues to express an allowance of a variation in attribute of a pixel by the value of the flag, and to add a flexibility not only in normality/fault determination for each pixel but also in total determination processing in which the entire image is checked by the total results of the respective pixels.

DISCLOSURE OF INVENTION

The present invention comprises a memory table (to be referred to as an index table hereinafter) provided for each pixel and having, as its elements, flags in a number corresponding to the number of density levels or colors of an image, and an index space obtained by grouping the index tables of all the pixels, wherein in a printed image appearance inspection in which a reference image and an image to be inspected are compared with each other, and a pixel having a pixel level value different from that of a corresponding pixel is detected and determined as a fault, a flag in the index space is turned on in accordance with a level value of each pixel of the reference image to generate a reference pattern in the index space, ON-flag propagation processing for turning on flags in the index space falling within positional difference and level variation ranges to be allowed as normal ranges during inspection is performed as preprocessing, multi attribute values consisting of coordinate values and a density or color level of a pixel of the image to be inspected is input, and a corresponding flag in the index space is referred to on the basis of the multi attribute values, thereby checking in accordance with ON/OFF of the flag whether the pixel is normal or defective.

According to the present invention, the values of each flag are not limited to binary values of ON and OFF, but the flag is a multivalue one which can take an arbitrary value. That is, a flag value which is weighted on the basis of a flag propagation distance (distance from a flag representing a reference pattern to a flag to be turned on by propagation processing) is stored and then compared with a threshold value determined in accordance with the nature of an image upon inspection, thereby checking whether the pixel is normal or defective.

According to the present invention, in order to compress the memory capacity of the index space having the flag values as elements (to be referred to as index space compression hereinafter), ON flag states are expressed and stored using a hierarchical structure because the number of ON flags among flags corresponding to the number of density levels or color levels of each pixel is small and they cluster together, thereby performing index space compression. If a multivalue flag is to be used, binary values are stored in layers except for the lowest hierarchical level as when a binary flag is used, and a multi level value is stored in an index table in the lowest hierarchical level, thereby performing the index space compression.

In the present invention, in order to perform the index space compression, one (X,Y) coordinate point in the index space corresponds to n x n pixels in the reference image. In addition, levels are thinned so that one flag corresponds to a number of levels of a pixel value of the reference image.

In order to realize the above high-speed fault detecting method, an apparatus according to the present invention comprises an image input unit for inputting an image signal, a buffer memory for adjusting an imaging speed of a camera and a processing speed of the apparatus, a pre-processing unit for converting input image data into image data suitable for inspection, a selector for switching a destination of an output from the pre-processing unit, a reference image memory unit for storing reference image data, an input image memory unit for storing object image data, an allowable condition memory unit for storing a variation allowable range, a feature extracting unit for extracting a feature of an image, a feature memory unit for storing the extracted feature amount, an index flag setting unit for forming a pattern equivalent to the reference image in an index space and for displaying an allowable range in the index space in accordance with allowable conditions corresponding to a color, level or image feature amount, an index table storing states of flags, a reference address generating unit for generating an address of the index table to be referred to on the basis of the object image data, an index flag referring unit for referring to the index table, a reference result memory unit, and a fault determining unit for determining whether the input image data (data to be inspected) is normal or defective on the basis of the reference results.

In order to improve an inspection precision, the present invention further comprises an image positioning unit for positioning the input image and the reference image, a level average value comparing unit for comparing level average values in areas of the input image and the reference image, and a control unit for controlling all of the above blocks.

BRIEF DESCRIPTION OF DRAWINGS

FIGS. 3A-D show views for explaining the high-speed fault detecting method for a monochromatic image using a two-dimensional index space;

FIGS. 4A-B show views showing a table in the index space with respect to one pixel of a color image;

FIGS. 5A-C show views showing an embodiment of a compressing method and a inspecting method for the index space, in which each of R, G and B of the color image has four gray levels;

FIGS. 7A-C show views in which multivalue flags are used as flags in the index space in the high-speed fault detecting method for a monochromatic image;

FIG. 8 is a view in which a fault is determined although a level difference falls within an allowable range;

FIGS. 14A-C2 show views showing a fault detecting method performed when various feature amounts such as complexity of an area in which a pixel is present as a level value are used as level axes;

BEST MODE OF CARRYING OUT THE INVENTION

The present invention will be described in detail below with reference to the accompanying drawings.

Figure 1A:
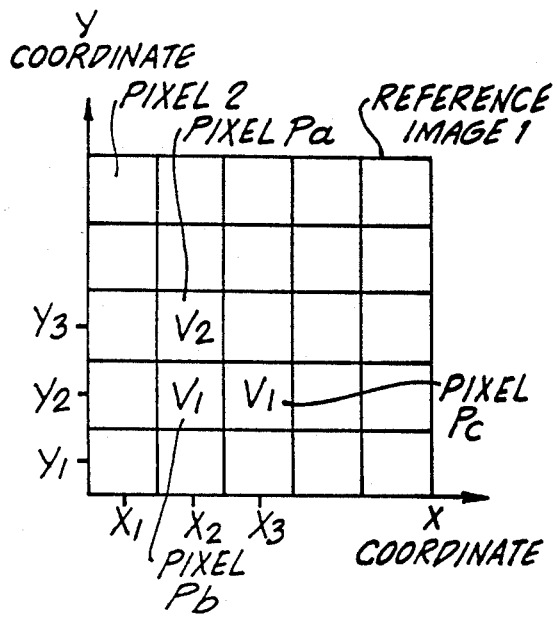
FIGS. 1A-C show views showing an embodiment of a high-speed fault detecting method for a monochromatic image.
Figure 1B:
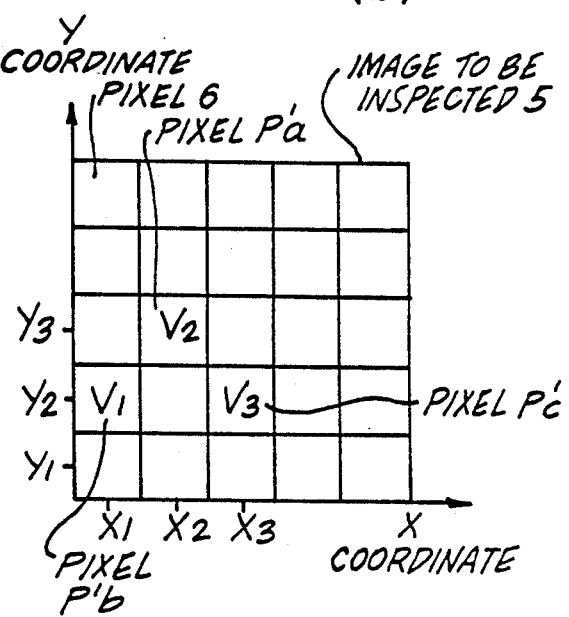
Figure 1C:
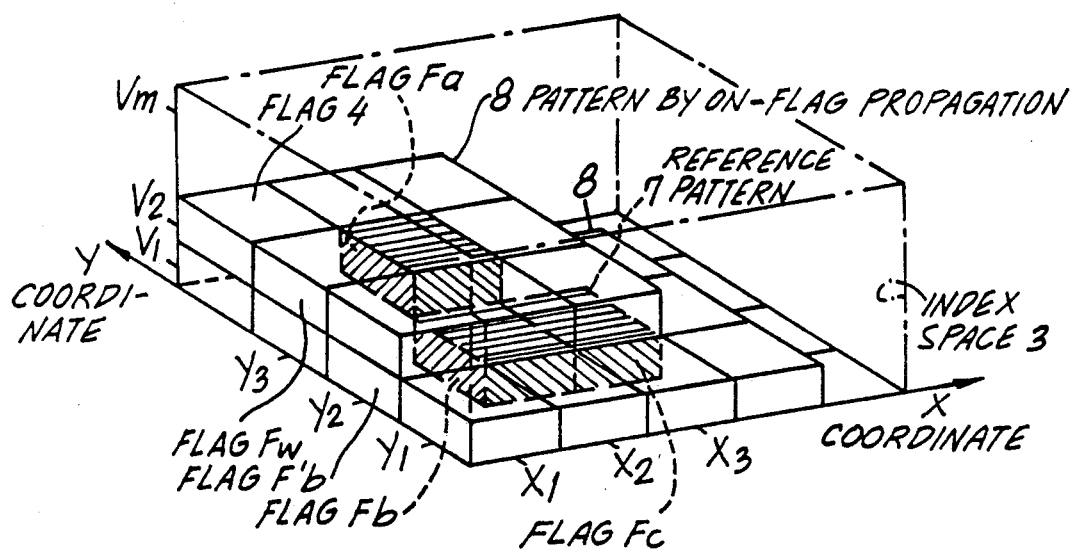

FIG. 1 shows views for explaining a high-speed fault detecting method for a monochromatic image according to an embodiment of the present invention. Image data without a fault or image data in which a fault is corrected is selected from image data of a product and used as a reference image 1 shown in FIG. 1(a). Assuming that the number of levels which each pixel 2 of the reference image 1 can take is $V_m$, a space having $V_m$ elements for each pixel 2 is provided. As shown in FIG. 1(c), this space has three axes of X, Y and level coordinates and is defined as an index space 3 (indicated by an alternate long and dashed line in FIG. 1(c)). The index space is constituted by block-type flags 4 which can take binary values of ON and OFF. In an initial state, all the flags are OFF.

Formation of a reference pattern will be described below. Since the $V_m$ flags 4 corresponding to the level number $V_m$ of each pixel 2 of the reference image 1 are provided for each (X,Y) coordinate point in the index space 3, a reference pattern 7 equivalent to the reference image 1 is formed in the index space 3 by turning on a flag 4 having a level value corresponding to one of level values $V_1$ to $V_m$ of each pixel 2 of the reference image 1. For example, as a pattern equivalent to pixels Pa, Pb and Pc having levels $V_1$ and $V_2$ in the reference image 1 shown in FIG. 1(a), hatched flags $F_a$, $F_b$ and $F_c$ are formed in the index space 3.

An inspecting method utilizing the index space in which the reference pattern 7 is formed as described above will be described below. If an image to be inspected 5 shown in FIG. 1(b) is equal to the reference image 1, all of three attribute values, i.e., X-coordinate, Y-coordinate and level values of each pixel 2 are equal to those of each pixel 6, respectively. That is, by referring to each flag 4 in the index space 3 in accordance with the X-coordinate, Y-coordinate and level values (to be referred to as three attribute values hereinafter) of each pixel of the image to be inspected 5, whether the image to be inspected 5 coincides with the reference image 1 can be determined in accordance with whether the flag 4 is ON or OFF. For example, since a pixel $P_a'$ in the image to be inspected 5 has coordinate values $(X_2, Y_3)$ and a level value $V_2$, a flag $F_a$ at a point $(X_2, Y_3, V_2)$ in the index space 3 is referred to. In this case, since the flag $F_a$ is ON, the pixel $P_a'$ is determined to be normal.

The basis of the inspecting method using the index space 3 has been described above. If, however, a positional difference or level variation which cannot be considered as a fault is present in the image to be inspected 5, this difference or variation may be determined to be a fault by simply applying the above method. As a result, a correspondence between the reference image 1 and the image to be inspected 5 is not correctly made. In this case, in order to express an allowable amount, the following processing is performed for each flag 4 in the index space 3 before inspection. This processing is flag expansion setting processing in which in addition to ON flags 4 as the reference pattern 7 formed in the index space 3 as a pattern equivalent to the reference image 1, flags 4 having allowable three attribute values are turned on. The allowable attribute values are present close to the attribute values of the pixel 2 in the reference image 1. Therefore, by arbitrarily setting allowable ranges, ON states are propagated to flags falling within arbitrary distance ranges in the X-, Y- and level-axis directions from the ON flags 4 in the reference pattern 7 as a pattern equivalent to the reference image 1. This processing will be referred to as ON-flag propagation processing hereinafter. ON states may be propagated to not only adjacent flags 4 but also arbitrary flags 4 having allowable attribute values in accordance with a determination reference of inspection, thereby flexibly expressing the allowable ranges.

States of the flags 4 formed in the index space 3 by the above ON-flag propagation processing represent a determination reference of inspection, and the inspection is performed using the index space 3 subjected to the ON-flag propagation processing. In this inspecting method, as in the above-mentioned method, for each pixel 6 of the image to be inspected 5, a corresponding flag 4 in the index space 3 is referred to once on the basis of attribute values of the pixel. In this case, a state of each flag 4 in the index space 3 expresses an allowable amount of a positional difference or level variation. For example, a plurality of non-hatched flags $F_W$ in the index pattern 3 shown in FIG. 1(c) are formed by propagating ON flags 4 around the hatched ON flags $F_a$, $F_b$ and $F_c$ which constitute the reference pattern 7 equivalent to the reference image 1 by ±1 pixels in each of the X and Y directions. A pattern 8 formed by this ON-flag propagation is used when inspection is to be performed under the conditions that an allowable amount of level variation with respect to the reference image 1 is zero and that of a positional difference is ±1 pixels in each of the X and Y axes.

Determination of pixels $P_b'$ and $P_c'$ in the image to be inspected 5 using the pattern 8 constituted by the hatched flags $F_a$, $F_b$ and $F_c$ and the non-hatched flags $F_W$ which are additionally turned on will be described below. That is, each flag 4 in the index space 3 is referred to on the basis of the three attribute values of a corresponding pixel 6, e.g., the flag $F_b'$ shown in FIG. 1(c) is referred to for the pixel $P_b'$. In this case, since the flag $F_b'$ is included in the pattern 8 and therefore has a flag value of ON, a normality is determined. That is, a positional difference of a $-1$ pixel in the X-axis direction is allowed to the pixel $P_b$ in the reference image 1. As for the pixel $P_c'$ shown in FIG. 1(b), since a corresponding flag 4 to be referred to is OFF, a fault is determined. That is, since an allowable amount of a level variation is zero, a fault is determined.

Figure 2:
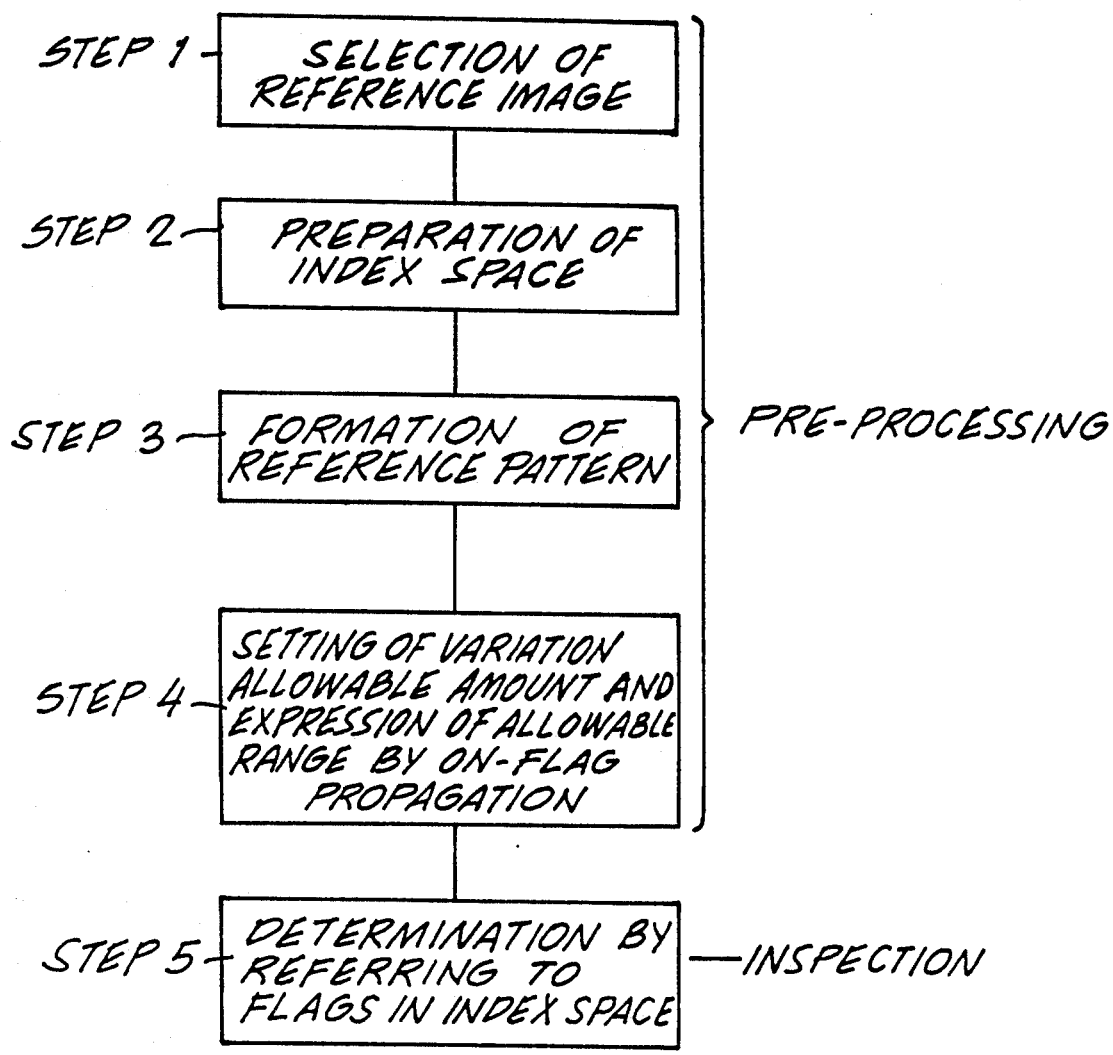
FIG. 2 is a flow chart for explaining a procedure performed by the embodiment of the high-speed fault detecting method.

A flow chart of the above fault inspecting method is shown in FIG. 2.

Step 1; A normal image without a fault or an image in which a fault is corrected is selected as a reference image from images to be inspected.

Step 2; An index space having, for each pixel of the reference image, ON-OFF binary flags in a number corresponding to a level number $V_m$ of the pixel is provided.

Step 3; Flags in the index space are turned on in correspondence with level values of the pixels in the reference image, thereby forming a reference pattern in the index space.

Step 4; An allowable amount of a positional difference or level variation is set for each pixel in the reference image, and flags having three attribute values (X-coordinate, Y-coordinate and level values) falling within the allowable ranges in the index space 3 are turned on.

Processing of steps 1 to 4 is performed once as preprocessing prior to a series of fault inspection.

Step 5; For each input pixel of an image to be inspected, a corresponding flag in the index space is referred to on the basis of the three attribute values of the pixel, thereby checking whether the pixel is normal or defective in accordance with whether the flag is ON or OFF.

In the conventional fault inspection method, one lot of 1,000 to 10,000 images having the same shape and pattern are input to check whether each image coincides with the reference. According to the present invention, however, even if the number of images to be inspected is several thousands or several tens of thousands, the pre-processing of steps 1 to 4 described above need only performed once for one or several lots, and only the processing in step 5 is repeatedly performed for each image to be inspected.

Referring to FIG. 1(c), the index space 3 is three-dimensionally expressed. An index space, however, may be two-dimensionally expressed using a table formed for each pixel and concerning an attribute value of the pixel.

FIG. 3 shows plan views for explaining the high-speed fault detecting method for a monochromatic image Referring to FIG. 3(a), as in FIG. 1(a), an image without a fault or an image in which a fault is corrected is selected from images to be inspected and used as a reference image 11.

Figure 3D:
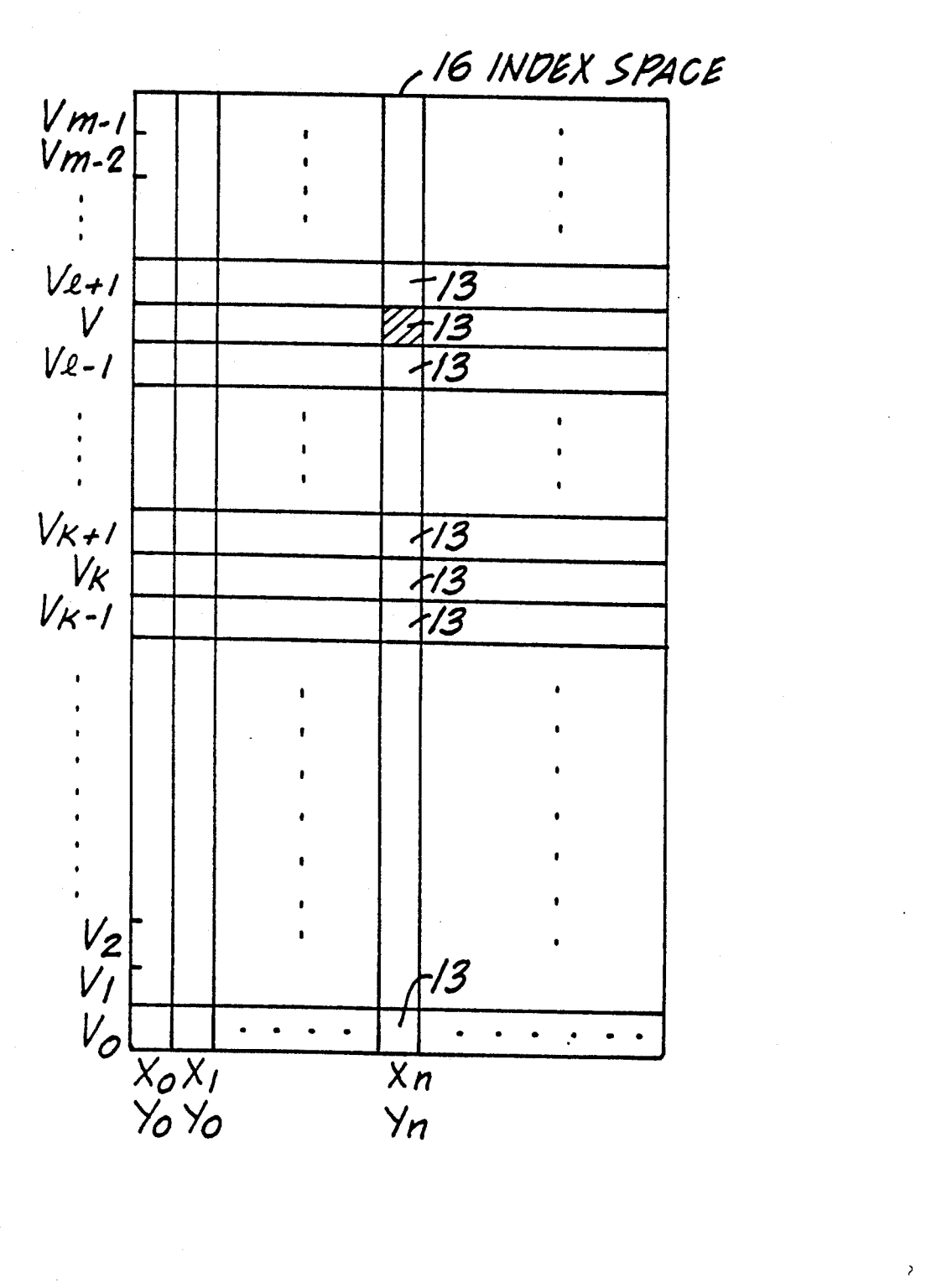

An index space is prepared as follows. That is, assuming that the number of density levels of the image is $V_m$, a table 15 having $V_m$ one-bit flags 13 as its elements and concerning the density $V_m$ of a pixel is provided for each pixel 12 of the reference image 11, as shown in FIG. 3(b). This table is defined as an index table. The index table is formed in correspondence with each pixel 12 which is defined by X and Y coordinates. A set of index tables of all the pixels becomes as shown in FIG. 3(d) to define an index space 16.

The index space 16 is constituted by one-bit flags 13 which can have a value of ON or OFF. In an initial states, all the flags are OFF.

Formation of a reference pattern will be described below. By turning on a flag 13 corresponding to a level value on the index table of each pixel 12, a reference pattern is formed in the index space. For example, assuming that the level value of a pixel 12 at a coordinate point $(X_n, Y_n)$ of the reference image 11 shown in FIG. 3(a) is V1, a flag 13 in a table corresponding to the coordinate point $(X_n, Y_n)$ and having the level value V1 is turned on as shown in FIGS. 3(b) and 3(d). This processing is performed for all the pixels in the reference image to form a reference pattern in the index space 16.

An inspecting method utilizing the index space 16 in which the reference pattern is formed as described above will be described below. If an image to be inspected 14 is equal to the reference image 11, X-coordinate, Y-coordinate and level values of each pixel 12 are equal to those of a corresponding pixel 12. Therefore, when a point in the index space 16 is directly referred to on the basis of the three attribute values of each pixel 12 in the image to be inspected 14, whether the image to be inspected 14 coincides with the reference image 11 can be checked in accordance with whether the flag is ON or OFF. For example, assume that a level value of a pixel 12 at the coordinate point $(X_n, Y_n)$ of the image to be inspected 14 shown in FIG. 3(c) is V1' and the index space in FIG. 3(b) or 3(d) is referred to by $X_n$, $Y_n$ and V1' (V1' corresponds to one of level values $V_0$ to $V_{m-1}$). In this case, if a flag at a corresponding position is ON, a normality is determined. If the flag at the corresponding position is OFF, a fault is determined. This is the same as described above with reference to FIGS. 1(a) to 1(c).

As described above with reference to FIGS. 1(a) to 1(c), in a method of allowing the image to be inspected 14 to have a positional difference or level variation within a range which is not considered as a fault, flags 13, located around the flags 13 which are turned on by the above reference pattern formation, and having allowable three attribute values are turned on, i.e., the ON-flag propagation processing is performed before inspection, thereby performing processing under predetermined allowable conditions. For example, by propagating ON flags 13 to level values $V_{+1}$ and $V_{-1}$ which are incremented/decremented from the level V at the coordinate point $(X_n, Y_n)$ shown in FIG. 3(a) by ±1 levels and to level values $V_{k+1}$ and $V_{k-1}$ which are incremented/decremented from a level $V_k$ at an adjacent coordinate point $(X_n, Y_{n-1})$ by ±1 levels, flags 13 having $V_{1+1}$, V1, $V_{1-1}$, $V_k$ and $V_{k-1}$ shown in FIGS. 3(b) and 3(d) are turned on, thereby expressing an allowable range of a level variation and a positional difference in the index space.

As described above with reference to FIG. 1, states of the ON flags 13 formed in the index space by the above ON flag propagation processing represent a determination reference of inspection, and the inspection is performed by referring to one of the flags in the index space once for each pixel.

For example, even if the level value V1' at the coordinate point $(X_n, Y_n)$ shown in FIG. 3(c) is not V1 but $V_{1-1}$ or $V_k$, processing in which a fault is not determined in the pixel at the coordinate point $(X_n, Y_n)$ can be executed by referring to the flag only once because the flags 13 having $V_{1-1}$ and $V_k$ are already turned on in FIG. 3(b).

A flow chart of the above fault inspecting method is the same as that shown in FIG. 1.

An embodiment of a high-speed fault inspecting method for a color image will be described below with reference to FIGS. 4(a) and 4(b), A fault detecting method for a color image is basically similar to that for a monochromatic image. In the case of a monochromatic image, an index space is determined by three attribute values, i.e., X- and Y-coordinate values and a level value of each pixel. In the case of a color image, however, an index space is determined by X- and Y-coordinate values and R, G and B (red, green and blue) level values, i.e., five attribute values. Therefore, as shown in FIG. 4(b), a table in the index space corresponding to each pixel is a cube having the R, G and B level values as its three axes.

FIG. 4 shows color image data in which each of R, G and B has four gray levels (values from 0 to 3). In this case, since one pixel can express 64 ($=4^3$) colors, 64 flags must be provided for each pixel in the index space. Therefore, in this embodiment, an index table is arranged such that 64 flags are provided in a cube (having the R, G and B level values as its three axes) having a side length of four.

In order to form a pattern equivalent to the reference image in the index space, a flag at a coordinate point (R,G,B) in the cube is turned on in accordance with R, G, and B values. For example, if pixel values at coordinate points $(x_0, y_0)$ of three R, G and B reference images are R=2, G=1 and B=1, respectively, a flag at a point (R,G,B)=(2,1,1) represented by a hatched flag V31 is turned on as an equivalent pattern. By performing ON-flag propagation processing for the ON flag V31 in order to allow a small color variation upon inspection, six flags 32 to 37 obtained by changing the attribute values of the ON flag V31 by ±1 in the R, G and B directions are turned on around the ON flag 31. As a result, not only the attribute values of the flag V31 but also those of the flags around the flag V31 can be allowed.

The above ON-flag propagation processing is performed in order to allow a color difference (signal level variation). In order to allow a positional difference, flags at coordinate points (R,G,B) corresponding to R, G and B values and color variation allowable ranges of adjacent pixels may be turned on.

As described above, if the index space per pixel is a cube having the R, G and B axes, a color space constituted by R, G and B signal values of camera outputs is nonlinear to a human color difference sensitivity and changes in accordance with imaging element characteristics, a light source, a camera parameter and the like. In order to perform inspection at high speed using the R, G and B signal values, color attributes in the index space must be the R, G and B values. Therefore, an isocolor space corresponding to the human color difference sensitivity must correspond to an RGB space of the imaging system. For this purpose, a unit color difference sensitive plane of a UCS (Uniform Chromaticity Scale) system for arbitrary R, G and B values is converted into a signal value change amount of an RGB system as follows.

(i) A correspondence between an RGB signal value obtained from the imaging system and an RGB colorimetric system is obtained.

(ii) A signal value of the RGB colorimetric system is converted into a signal value of an XYZ colorimetric system and then converted into a signal value of a CIEL*a*b* colorimetric system which is best suited to a small color difference problem among the UCS systems.

(iii) A unit color difference sensitive plane (sphere) having an L*a*b* value as its center is obtained.

(iv) The unit color difference sensitive plane is converted into a signal change amount in the RGB colorimetric space by reverse conversion.

After the unit color difference sensitive plane is obtained in the RGB space by the above conversion, flags within this range are turned on to set a color variation allowable range corresponding to the human color difference sensitivity.

In order to perform inspection corresponding to the human color difference sensitivity by the conventional method, the R, G and B values of each pixel must be converted into signal values in the isocolor space to check whether a difference with respect to reference data falls within the allowable color difference range. Therefore, a processing amount is increased to disable high-speed inspection. In the above method, however, the flag processing is performed for the index space as pre-processing. Therefore, since inspection can be executed by simply referring to the flags, it can be executed at high speed even if reference setting is cumbersome.

In the above method, the index space for a color image is a cube having three axes of R, G and B values. Three index spaces, however, may be independently provided to R, G and B. In this arrangement, an index space having, for each pixel, flags in a number corresponding to the number of gray levels of each color as shown in FIG. 3 is provided to each of the three R, G and B reference images, thereby independently checking each of the R, G and B by referring to a corresponding index space. In this method, a color variation allowable range corresponding to the human color difference sensitivity cannot be precisely set. The method is, however, practically satisfactory, has a simple apparatus arrangement and requires only a small memory capacity.

A method of compressing an index space will be described below.

In the case of a monochromatic image, the number of flags required for each pixel correspond to the number of density levels of the image. For example, if the density level number is 256, 256 bits are required for each pixel. Assuming that an image size is 512×800 pixels, a memory capacity required for the index space is about 13 M-bytes. On the contrary, in the case of a color image, if flags are provided for each pixel in correspondence with 16,700,000 ($256^3$) colors which can be expressed when the number of gray levels of each of R, G and B data is 256, the index space requires about 2 M-bytes per pixel. In this case, assuming that an image size is 512×800 pixels, a total memory capacity is significantly increased up to about 800 G-bytes, and such a memory cannot be realized.

In this case, however, since image data has characteristics that ON flags included in the index space are coarsely distributed and locally concentrated, the index space can be compressed by expressing states of the ON flags using a hierarchical structure. Although the index space compression can be performed for either a monochromatic image or color image, methods of compressing and inspecting the index space in the case of a color image will be described below with reference to FIG. 5.

Figure 5A:
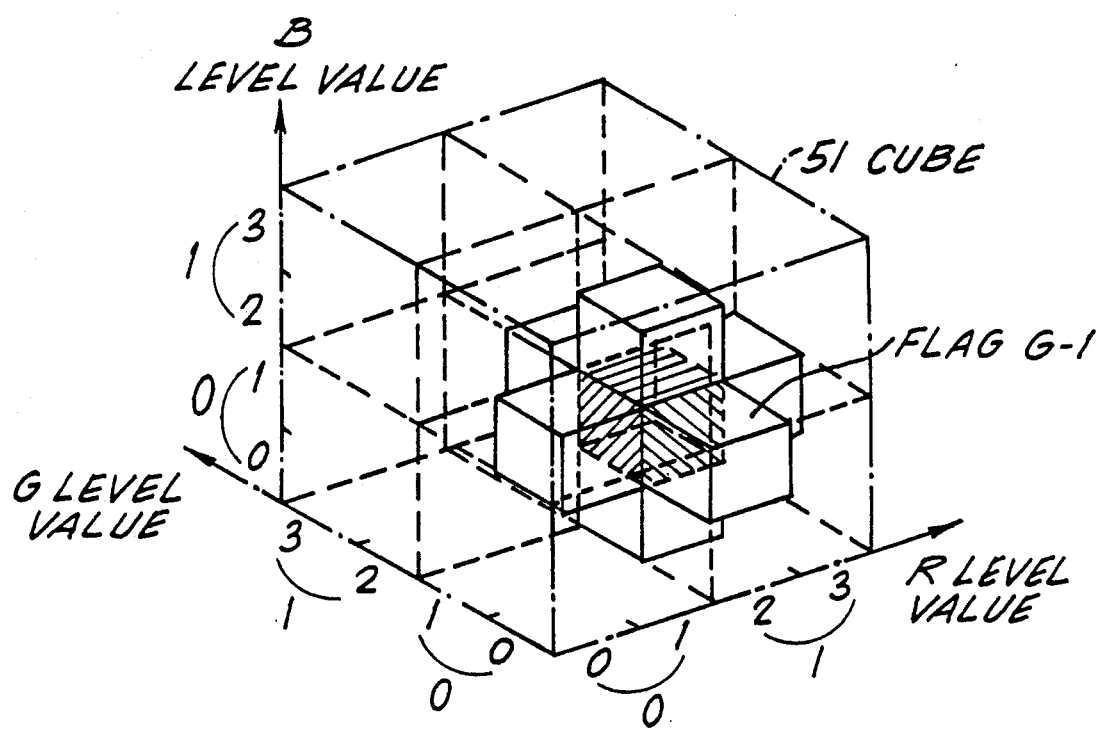

A cube having three R, G and B axes is divided by N along each axis to form $N^3$ small cubes. Each small cube is then similarly processed to repeat division, and only small cubes including ON flags are stored in a table. For example, a cube 51 shown in FIG. 5(a) is divided by two to form eight small cubes indicated by dotted lines. As indicated by a hierarchical level 1 shown in FIG. 5(b), an 8-bit table in which a single small cube corresponds to one bit is provided. The position of each small cube is designated using coordinates (to be referred to as small cube coordinates hereinafter) obtained by equally dividing each axis of the parent cube and representing the first and last halves thereof by "0" and "1", respectively. Each bit in the 8-bit table of the hierarchical level 1 corresponds to the small cube coordinates as shown in FIG. 5(c). Referring to FIG. 5(a), of the eight small cubes in the hierarchical level 1, four small cubes represented by small cube coordinates (R=0,G=,B=0), (1,0,0), (1,1,0) and (1,0,1) have ON flags. In this case, flag states on the 8-bit table is as indicated by the hierarchical level 1 shown in FIG. 5(b). The four small cubes having flags of ON=1 in the hierarchical level 1 are further divided by eight from the one having a smallest bit number. When the small cubes having ON flags are expressed as tables, four tables shown in a hierarchical level 2 of FIG. (b) are obtained. In this manner, the ON flag states in the cubes can be expressed as the tables having 40 bits by compression from 64 bits per pixel (eight bits for the hierarchical level 1 and 32 bits for the hierarchical level 2). Inspection using the above compressed space is performed as follows. Assuming that R, G and B values of data to be inspected are, e.g., R, G and B=2, 0 and 1 [corresponding to a flag G-1 in FIG. 5(a)], respectively, a cube at small cube coordinates (1,0,0), i.e., bit number 1 is referred to in the hierarchical level 1 shown in FIG. 5(b), and a small cube at small cube coordinates (0,0,1) (flag area bit number=4) obtained by further dividing the small cube by eight is referred to in the hierarchical level 2 therein. In this embodiment, since the referred flag is ON in either the hierarchical level 1 or 2, the attribute G-1 is determined to be normal.

In general, a cube having three R, G and B axes is divided by X along each axis to form a table consisting of $X^3$ bits, and "1"s are written in bits on the table corresponding to small cubes including ON flags. The small cubes including the ON flags, i.e., those corresponding to the bit numbers in which "1"s are written on the table are similarly processed to repeat division and formation of a table, thereby forming tables for only areas in the index space including ON flags.

Figure 6A:
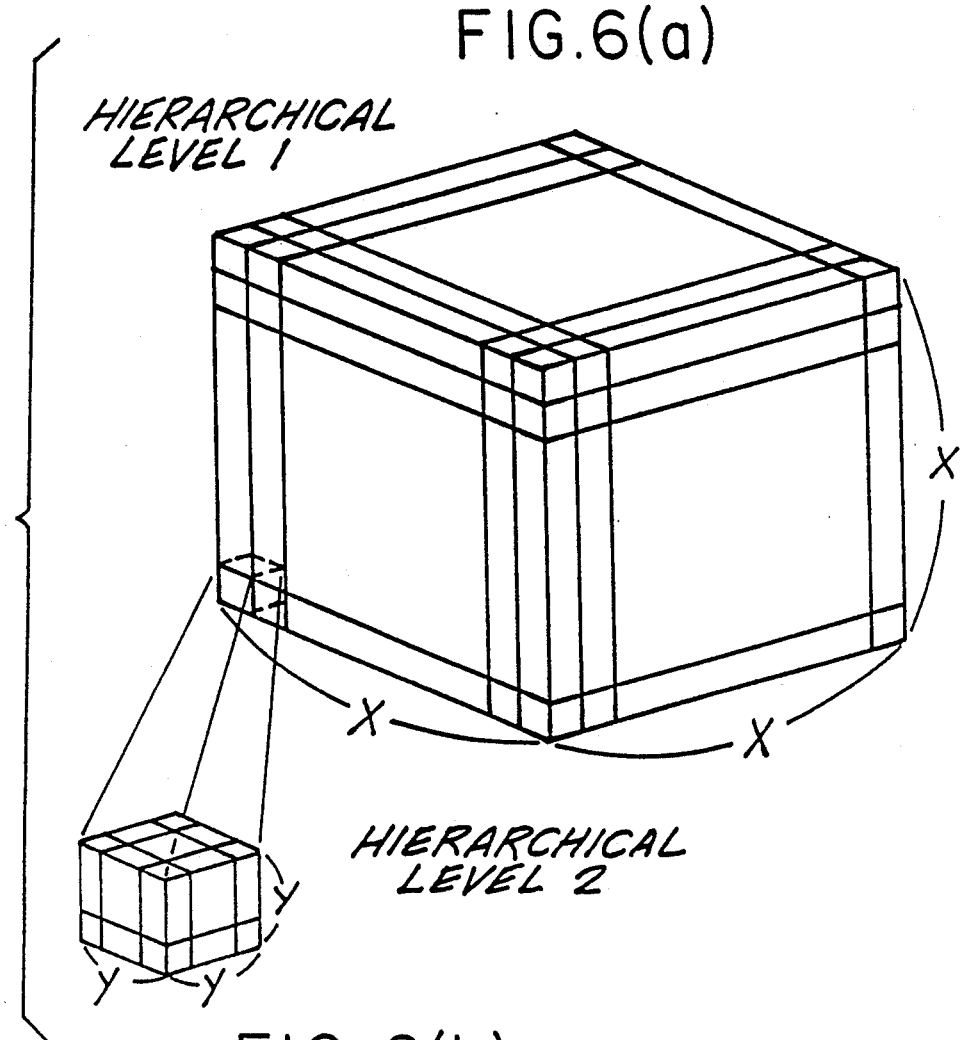
FIGS. 6A-B show views showing a conventional compressing method for the index space, in which the table of the color image is used.
Figure 6B:
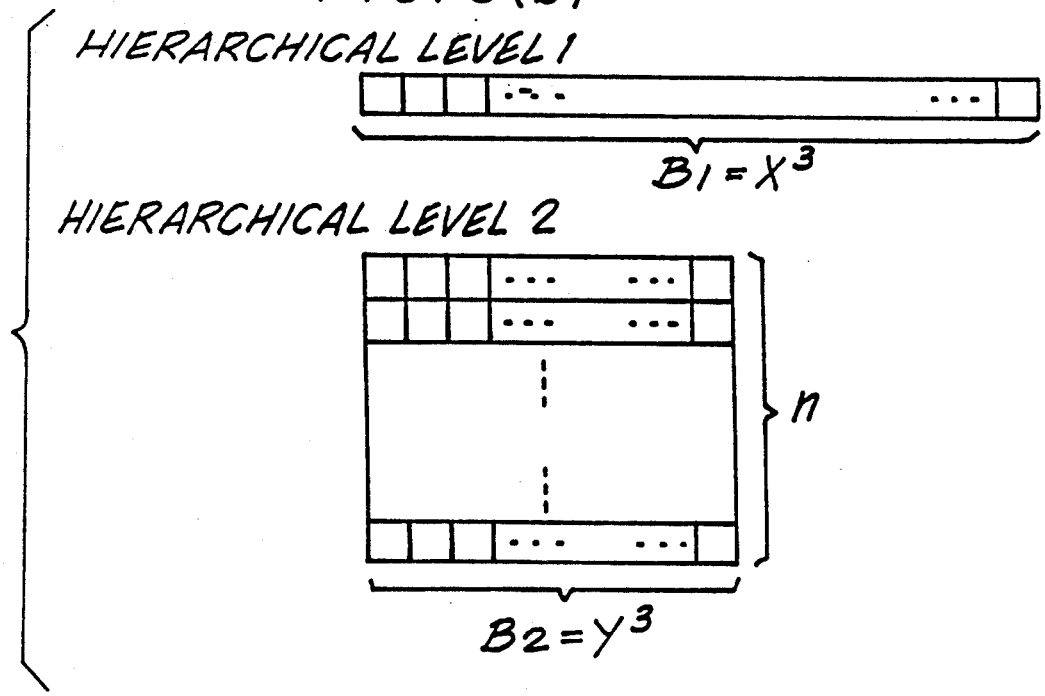

For example, as shown in FIG. 6(a), a cube of a hierarchical level 1 having three R, G and B axes are divided by X along each axis to form $X^3$ small cubes. At the same time, a table of the hierarchical level 1 having $X^3$ bits is formed as shown in FIG. 6(b), and "1"s are written in bits corresponding to n small cubes including ON flags. Each of the n small cubes including the ON flags is divided by Y along each axis to form $Y^3$ small cubes. At the same time, n tables of the hierarchical level 2 having $Y^3$ bits are formed, and "1"s are written in bits corresponding to small cubes including ON flags. Note that the axes need not be divided by the same number but may be divided by arbitrary different numbers.

As is apparent from the above embodiment, even if the number of color attributes to be expressed is increased, flag areas can be commonly used between close color attributes in the upper levels to efficiently perform index space compression. If the flag areas are commonly used between close pixels, a compression ratio can be further increased. With the above hierarchical structure, the index space can be compressed at high density to reduce the memory capacity. An inspection processing time, however, is proportional to the number of levels in the index space. Therefore, the number of levels in the index space is determined in consideration of both the memory capacity and the processing speed.

In the above embodiments, each flag in the index space can take binary values of ON and OFF and has one bit. The flag, however, need not be a binary one but may be a multivalue one, and a referred flag value can be used in inspection/determination. For example, a maximum value is written in a flag directly corresponding to a level value of a reference image, and a flag value is decreased as a propagation distance is increased during flag propagation, thereby expressing an allowance of an attribute by the flag value.

FIG. 7 shows still another embodiment in which a multivalue flag is applied to a monochromatic image. In FIG. 7, an index space is prepared as follows. That is, if the number of density levels of each pixel 72 of a reference image 71 is $V_m$, a table having, as its elements, flags consisting of $V_m$ bits is prepared as shown in FIG. 7(b). In the above table provided for each pixel, a maximum value is written in a flag directly corresponding to a level value of a pixel to be inspected of the reference image. For example, if a level value of a pixel 72 at a coordinate point $(X_n, Y_n)$ of the reference image 71 in FIG. 7(a) is Vl, an allowance of 100% is written in a flag having a level value Vl as shown in FIG. 7(b). As described in the embodiments shown in FIGS. 3 to 4, in order to allow a level variation and a positional difference, ON-flag propagation processing is performed as pre-processing. In this case, as a propagation distance is increased, an allowance of a flag is decreased. For example, in FIG. 7(b), an allowance of flags having level values $Vl_{+1}$ and $Vl_{-1}$ obtained by incrementing/decrementing the level value Vl of the pixel at the coordinate point $(X_n, Y_n)$ by $\pm 1$ levels, respectively, is set to be 90%, and an allowance of flags having level values $V_{+2}$ and $V_{-2}$ obtained by incrementing/decrementing the level value Vl by $\pm 2$ levels, respectively, is set to be 40%. In order to allow a positional difference, in FIG. 7(b), an allowance of a flag directly corresponding to a level value $V_k$ of a pixel at an adjacent coordinate point $(X_n, Y_{n-1})$ is set to be 80%, and an allowance of flags having level values $V_{k+1}$ and $V_{k-1}$ obtained by incrementing/decrementing the level value $V_k$ by $\pm 1$ levels, respectively, is set to be 50%. Inspection is performed by referring to flags shown in FIG. 7(b) in accordance with coordinate values $X_n$ and $Y_n$ of an image to be inspected 74 and a level value V' of a pixel 72. In this case, if an allowance of a flag is larger than a threshold value, a normality is determined. If the allowance of the flag is smaller than the threshold value, a fault is determined. That is, an allowance of an attribute can be expressed by a value represented by a flag corresponding to a level value. Even when a multivalue flag is used, normality/fault determination can be performed by checking whether a value of the flag referred to during inspection is larger than "0" (not zero) or is "0". This corresponds to a case in which the above threshold value is "0".

In the case of a color image, a multivalue flag can be used as in the above method. That is, when index spaces are to be provided for R, G and B, respectively, multivalue flags can be used for each of R, G and B by a method similar to that for a monochromatic image. In order to express a table in an index space as a cube having three axes of R, G and B, a flag allowance of a flag V31 shown in FIG. 4 is set to be a maximum value of 100% because this flag corresponds to a level value of each of R, G and B. Similarly, allowances of flags 32, 33, 34, 35, 36 and 37 are set to be 70%, 80%, 75%, 85%, 90% and 95%, respectively.

When the multivalue flag is used, inspection is performed for each pixel, and the inspected pixel is determined to be defective if an allowance represented by a flag value exceeds an allowable range. In order to improve reliability of determination, however, total determination is finally performed after determination results of all pixels are obtained. For example, even when a certain pixel is determined to be defective, if pixels around the defective pixel are normal, this pixel is determined to be an independent noise component and therefore is excluded from defective pixels.

Figure 8:
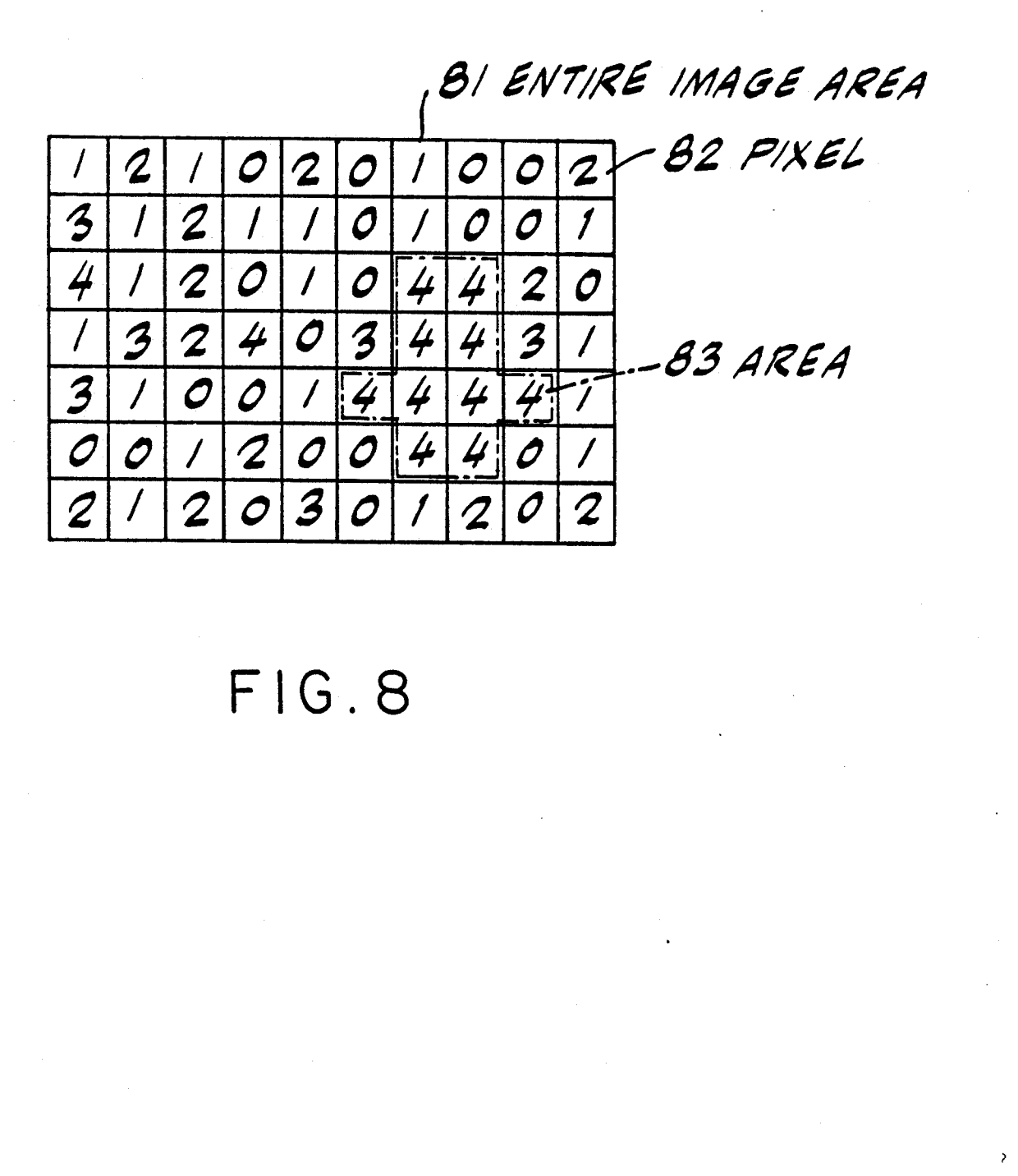

On the contrary, even when a level difference falls within an allowable range, if pixels having certain level differences together occupy an area exceeding a predetermined area, this area is determined to be defective. FIG. 8 is a view for explaining this case. Referring to FIG. 8, reference numeral 81 denotes an entire image area, and reference numeral 82 denotes each pixel. A numeral in each pixel represents a difference from a corresponding pixel of a reference image. For example, assuming that an allowable limit (threshold value) of a level difference of each pixel is 5, level differences fall within this allowable range throughout the entire area in FIG. 8. An area 83 in which pixels having a level difference of 4 spread to a certain extent can be determined to be defective in total determination. In this case, a value of interest is a level difference, but the value may be an allowance. That is, if pixels having lower allowances even within an allowable range together occupy an area exceeding a predetermined area, this area can be determined to be defective in total determination.

In addition, a positional difference between corresponding pixels may be stored during inspection and used in total determination. For example, when positional differences of corresponding pixels falling within a certain range are in the same direction, if a direction of one of these pixels is different, this pixel must be processed as a defective pixel. In order to realize this operation by the method of the present invention, amounts which are ON-flag-propagated in x and y directions may be written as values of a multivalue flag to allow a positional difference. Since a flag consists of a plurality of bits, x- and y-direction differences can be written in different bit ranges by bit assignment. Alternatively, a plurality of flags may be provided for one attribute value in an index space so that the x- and y-direction differences are written in different flags. In either of the above methods, when a flag corresponding to a level value of each pixel of an image to be inspected is referred to upon inspection, the x- and y-direction differences can be simultaneously obtained.

A method of compressing an index space when a multivalue flag is used will be described below. Even when a multivalue flag is used, index space compression can be performed by applying the hierarchical structure described above. In this case, a flag value is written in a table of the lowest hierarchical level, and information representing whether an ON flag is included in lower levels is written in tables of upper levels, as in the above compression method.

Figures 9A, 9B:
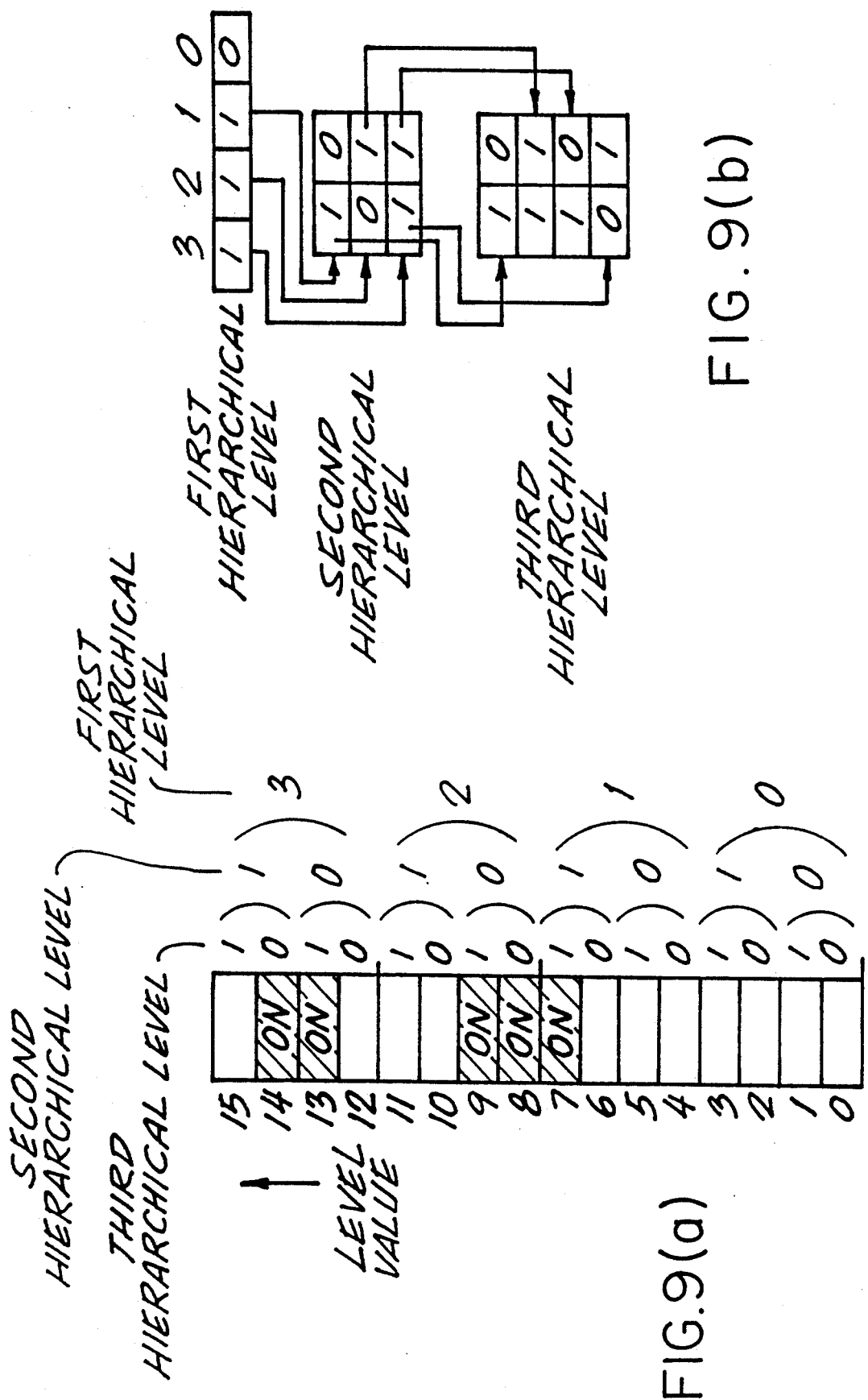
FIGS. 9A-B show views showing a method of compressing an index table having binary flags as its elements in a monochromatic image.

FIG. 9 shows a method of compressing an index space having binary values of ON and OFF as a flag value in a monochromatic image. For example, assume that ON flags shown in FIG. 9(a) are set for a pixel of a monochromatic image having 16 gray levels. First, second and third levels are divided by four, two and two, respectively, and flags are expressed by a hierarchical structure. As a result, tables of three levels are formed as shown in FIG. 9(b). Since a value in a compressed table need only represent the presence of a flag, the value is "1" for an ON flag and "0" for an OFF flag.

Figures 10A, 10B:
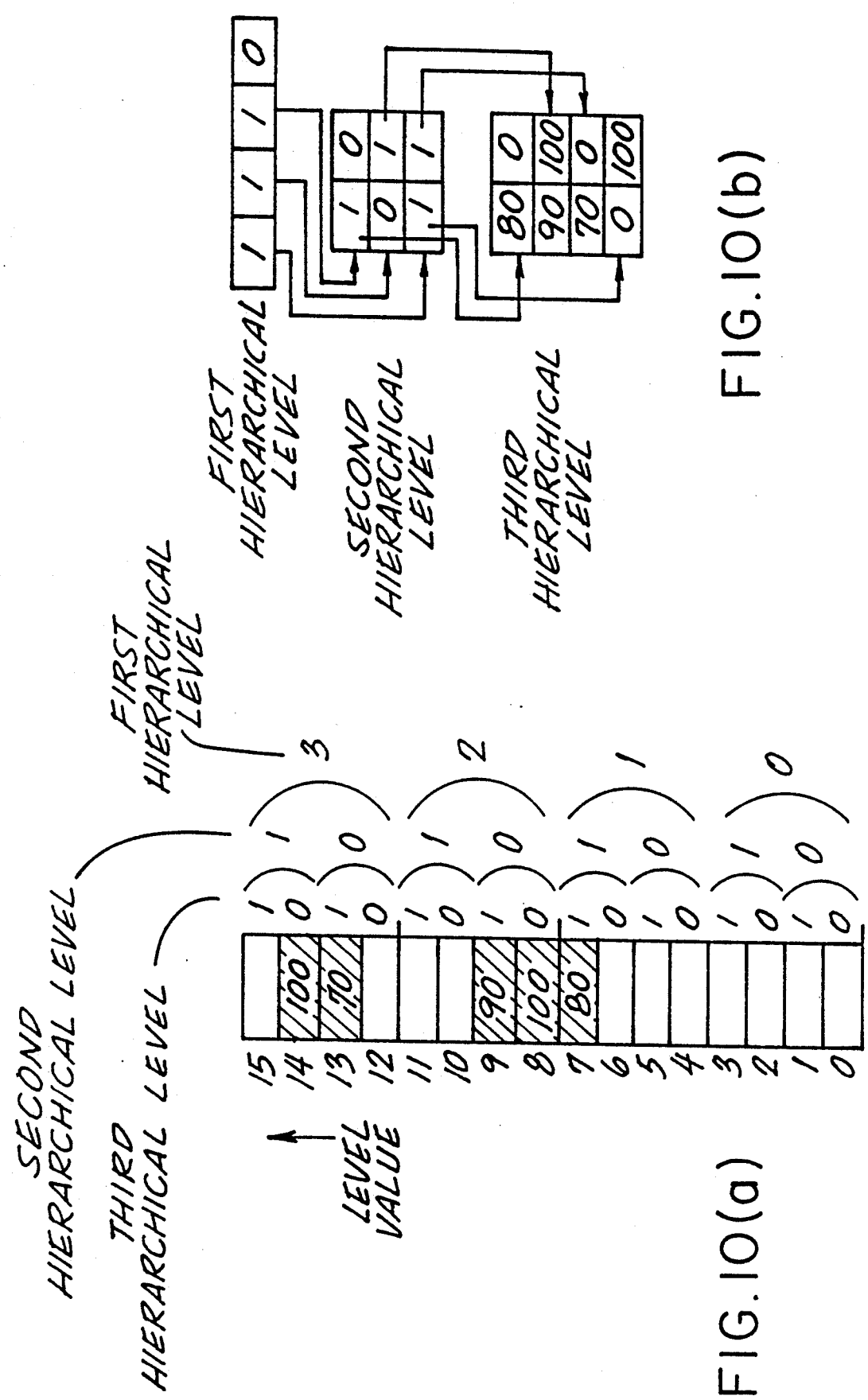
FIGS. 10A-B show views showing a method of compressing an index table having multivalue flags as its elements in a monochromatic image.

In order to express the index table shown in FIG. 9(a) by multivalues, an allowance of an attribute, for example, is written in each flag. For example, the index table shown in FIG. 9(a) is replaced with a table having multivalue flags, and values as shown in FIG. 10(a) are set as flag values. When the index table shown in FIG. 10(a) is compressed by the same hierarchical structure as shown in FIG. 9(b), tables as shown in FIG. 10(b) are obtained. That is, only binary values of "0" and "1" as information representing whether a flag is present in second and third levels are written in tables of first and second levels, respectively, and flag values are written in the third hierarchical level. A difference between the binary values and multivalues appear only in the table of the lowest hierarchical level (in this case, the third hierarchical level).

Figures 11A, 11B:
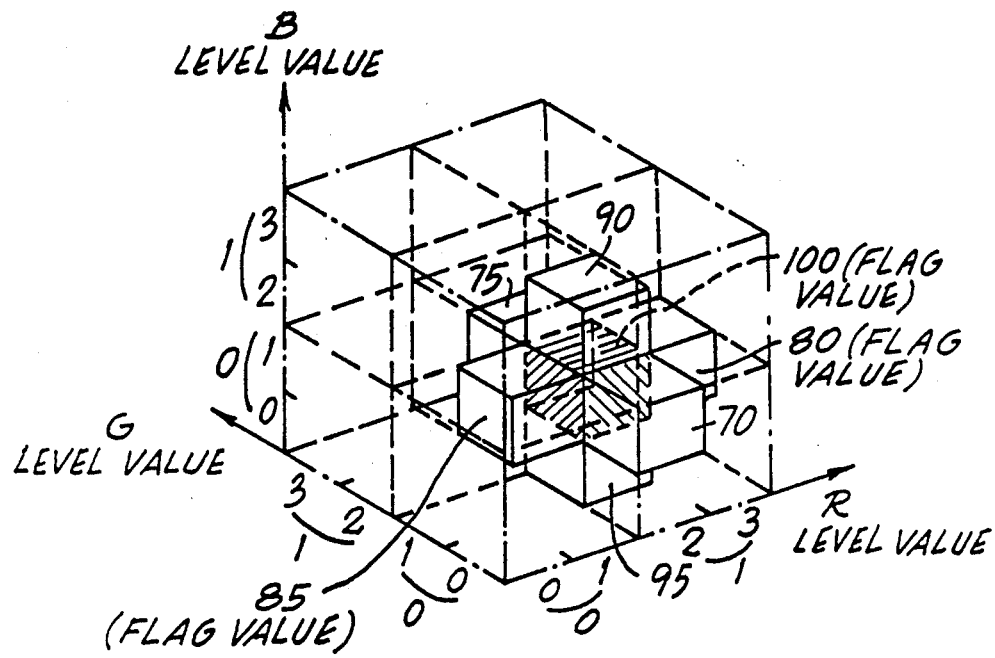
FIGS. 11A-B show views showing a method of compressing an index table having multivalue flags as its elements in a color image.

FIG. 11 shows a method of compressing a multivalue flag in a color image. For example, assume that a table is constituted by $4^3$ cubes for a color image in which each of R, G and B has four gray levels (i.e., 64 colors can be expressed). In this case, if multivalue flags are set as shown in FIG. 11(a), tables are obtained by index space compression as shown in FIG. 11(b). As shown in FIG. 11(b), the table of a first hierarchical level 1 represents information representing whether a flag not having "0" (so-called ON flag) is included in each small cube obtained when each of the R, G and B axes is first divided by two (three-dimensionally, eight). Flag values are written in the table of the lowest hierarchical level (in this case, the second hierarchical level).

The above fault inspecting method is not limited to a one-to-one correspondence such as X and Y coordinate values in the index space with respect to X and Y coordinate values of the reference image. That is, a pair of X and Y coordinate values in the index space can correspond to n x n pixels in the reference image.

Figures 12A, 12B, 12C:
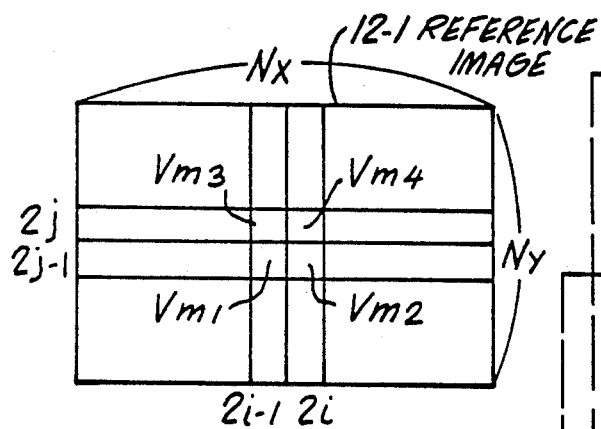
FIGS. 12A-C show views showing a compressing method and an inspecting method for X and Y sizes as index space compression.

For example, as shown in FIG. 12(a), if an image size of a reference image 12-1 is $N_x \times N_y$, an index space in which a size of X- and Y-coordinate axes is $N_x/2 \times N_y/2$ is prepared. Attribute values of four pixels at coordinate points (2i-1,2j-1), (2i,2j-1), (2i-1,2j) and (2i,2j) of the reference image 12-1 are written in an index table 12-2 at X and Y coordinates (i,j) in the index space. For example, assume that a level value of the point (2i-1,2j-1) is $V_{m1}$, that of the point (2i,2j-1) is $V_{m2}$, that of the point (2i-1,2j) is $V_{m3}$ and that of the point (2i,2j) is $V_{m4}$. In this case, as shown in FIG. 12(b), flags $F_1$ to $F_4$ in the index table at the point (i,j) in the index space are turned on. When ON-flag propagation processing is performed in a level direction, flags $F_5$ to $F_9$ are turned on. In order to inspect four pixels at points (2i-1,2j-1) to (2i,2j) of an image to be inspected 12-3, the flags in the table at the X-Y coordinate point (i,j) in the index space are referred to. In this embodiment, the ON-flag propagation processing is performed in the level direction, but propagation, to allow a positional difference, can also be performed.

As described above, if the X-Y size in the index space is reduced smaller than the image size of the reference image, a resolution of a pixel upon inspection is reduced by a reduction ratio of the X-Y size in the index space. However, even when one X-Y coordinate point in the index space is to correspond to a plurality of pixels in the reference image, flags are turned on if level values are present in the reference image. Therefore, a normal pixel level is not determined to be defective in inspection. Since level values of adjacent pixels are normally similar to each other, if level values of a plurality of pixels are written in a single index table, flags having largely different levels are not set in the table.

In this above description, the X-Y size is compressed as index space compression, but a level-direction size may be compressed. That is, level values of the reference image and those in the index space need not correspond to each other in a one-to-one correspondence, but the levels may be thinned so that a single flag corresponds to a plurality of levels of pixels of the reference image.

Figures 13A, 13B, 13C:
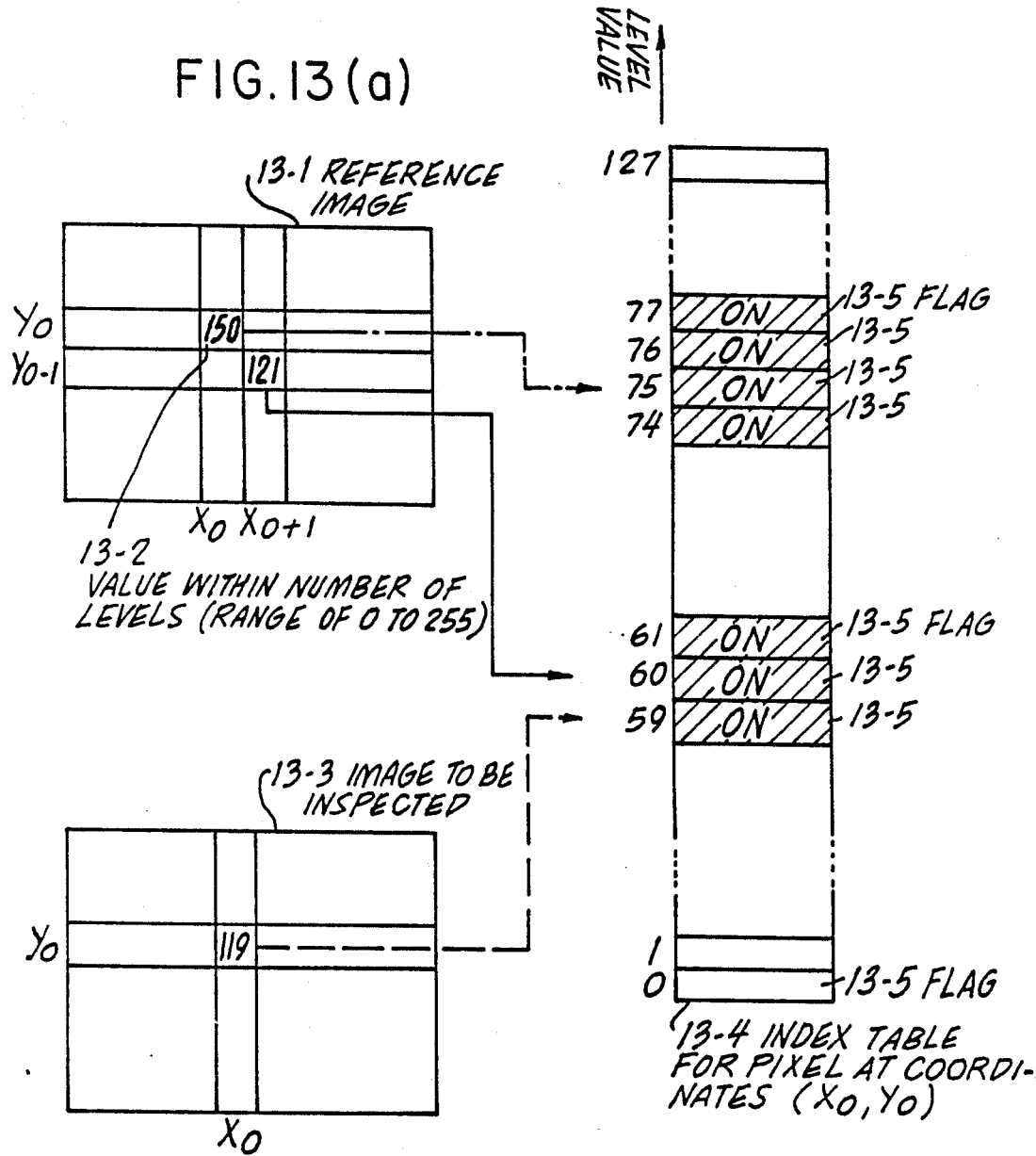
FIGS. 13A-C show views showing a compressing method and an inspecting method for a level-direction size as index space compression.

For example, if the number of gray levels of a reference image 13-1 is 256 as shown in FIG. 13, an index table having 128 flags for each pixel is provided as shown in FIG. 13(b). Upon flag setting, flags having level values corresponding to values half (integer values not exceeding half values of) those of the reference image 13-1 are turned on. For example, a flag at a level 75 is turned on for a level value 150 of the reference image. In addition, flags adjacent to the level 75 are turned on by ON-flag propagation processing. In order to allow a positional difference, flags corresponding to level values of pixels around the pixel of interest are turned on. Also in this case, flags corresponding to half values of the level values of the pixels are turned on. Inspection is performed by referring to a flag corresponding to a half value of a level value of a pixel of an image to be inspected 13-3. For a level value 119 at a coordinate point $(x_0,y_0)$ shown in FIG. 13(c), a flag at a level value 59 in the index table is referred to.

In the above description, the level values represent density levels, color signal levels or the number of colors. As the level values, however, feature amounts of various images in an area in which pixels are present may be adopted as a level axis. If a complexity around a pixel represented by an edge density is used as an attribute, a space having (density gray level number)×(complexity level number) flags for each pixel is prepared, and a reference pattern is formed by ON flags. Thereafter, flags in the space are referred to on the basis of X and Y coordinate values, a density value and a complexity of each pixel in an image to be inspected, thereby performing normality/fault determination. FIG. 14 shows this method. FIG. 14(a-1) shows a reference image. FIG. 14(a-2) shows image data having a complexity intensity value extracted by a complexity extracting circuit from the reference image. As shown in FIG. 14(b), a table having (gray level number) x (complexity level number) flags is prepared. For example, for a level value Vl and and a complexity intensity $C_k$ of a pixel at a point $(x_0,y_0)$, a flag $F_0$ in a table at a point $(Vl,C_k)$ of a pixel at the point $(x_0,y_0)$ is turned on. By ON-flag propagation processing in level and complexity directions, surrounding flags are turned on as shown in FIG. 14(b). Inspection is performed by obtaining image data representing the complexity intensity shown in FIG. 14(c-2) on the basis of an image to be inspected shown in FIG. 14(c-1) and referring to the table in accordance with the level value and complexity intensity.

Alternatively, two index spaces, i.e., a space having (a density gray level number) of flags for each pixel and a space having (a complexity level number) of flags for each pixel may be provided, and corresponding flags in the index spaces are turned on by using a reference image to form a reference pattern. Thereafter, on the basis of three attribute values, i.e., X and Y coordinate values and a density value and three attribute values, i.e., X and Y coordinate values and a complexity of each pixel of an image to be inspected, flags in the two index spaces are referred to. If the two referred flags are turned on, a normality is determined. That is, in accordance with required conditions of inspection, the number of index spaces or an attribute of a flag can be arbitrarily set.

Figure 15A:
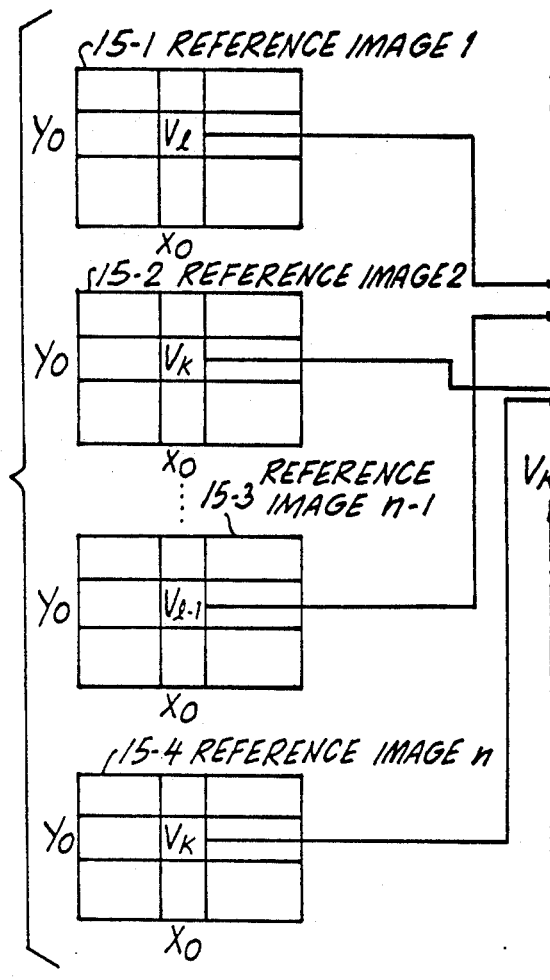
FIGS. 15A-D show views showing a fault detecting method performed when a plurality of reference images are used.
Figure 15B:
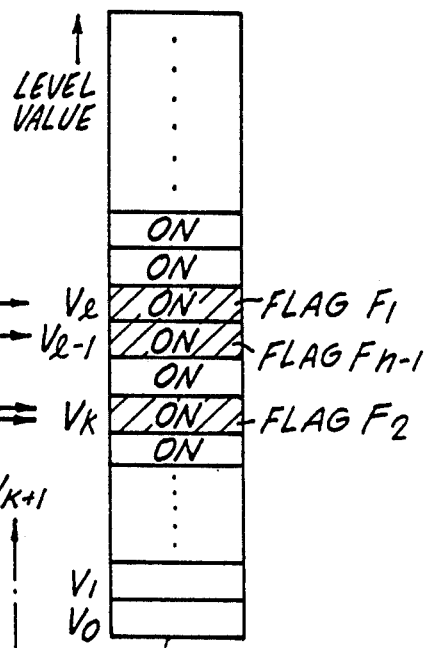
Figure 15C:
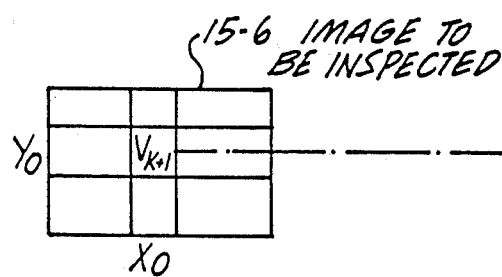

In addition, the number of reference images to be selected is not limited to one. For example, in order to form reference patterns in an index space by using all of a plurality of image data which can be considered to be normal as reference images, patterns equivalent to the respective reference images may be formed to overlap each other in a single index space. For example, as shown in FIG. 15(a), n reference images are prepared. By turning on flags in an index table corresponding to level values of pixels of interest in all of the n reference images, patters equivalent to the reference images 1 to n are formed to overlap each other in a single index space. For example, by turning on flags corresponding to level values of pixels at a coordinate point $(x_0,y_0)$ in the respective reference images, patterns indicated by hatched ON flags $F_1$, $F_2$ and $F_{n-1}$ shown in FIG. 15(b) are formed. By performing ON-flag propagation processing, non-hatched flags in FIG. 15(b) are turned on. Inspection is performed by referring to a flag corresponding a level value of a pixel to be inspected. For a coordinate point $(x_0,y_0)$ in FIG. 15(c), a flag corresponding to a level $V_{k+1}$ is referred to.

Figure 15D:
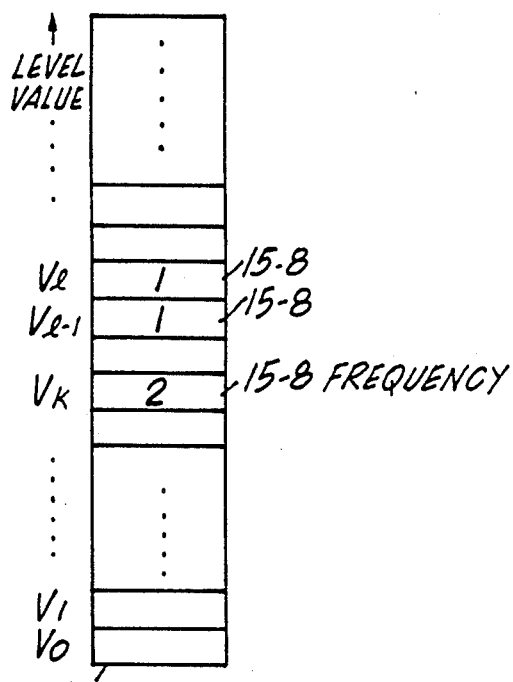

When a flag corresponding to a level value of each reference image is to be turned on, the flag need not be simply turned on, but a multivalue flag may be used to form a histogram using the number of corresponding operations. In this case, for example, a table shown in FIG. 15(d) is formed. A level having a high frequency in the histogram is suitable as a reference level. Therefore, by adjusting an ON-flag propagation amount in accordance with the frequency, an optimal reference pattern can be formed.

An ideal reference image such as a designed image (graphic pattern) may be set as a reference image to be input, thereby forming a reference pattern representing this image in an index space.

Figure 16:
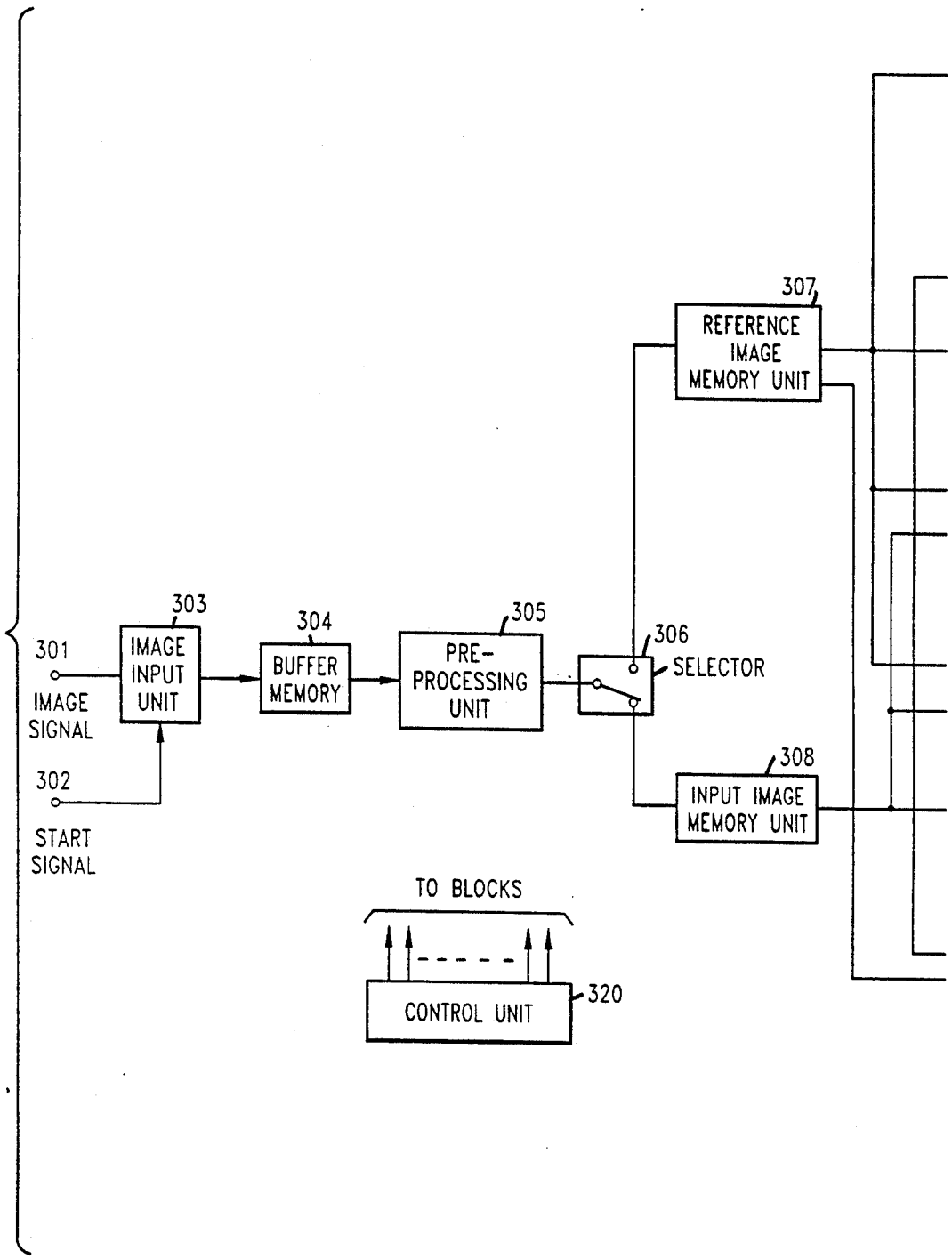
FIG. 16 is a block diagram showing a basic embodiment of a high-speed fault detecting apparatus according to the present invention.
Figure 16:
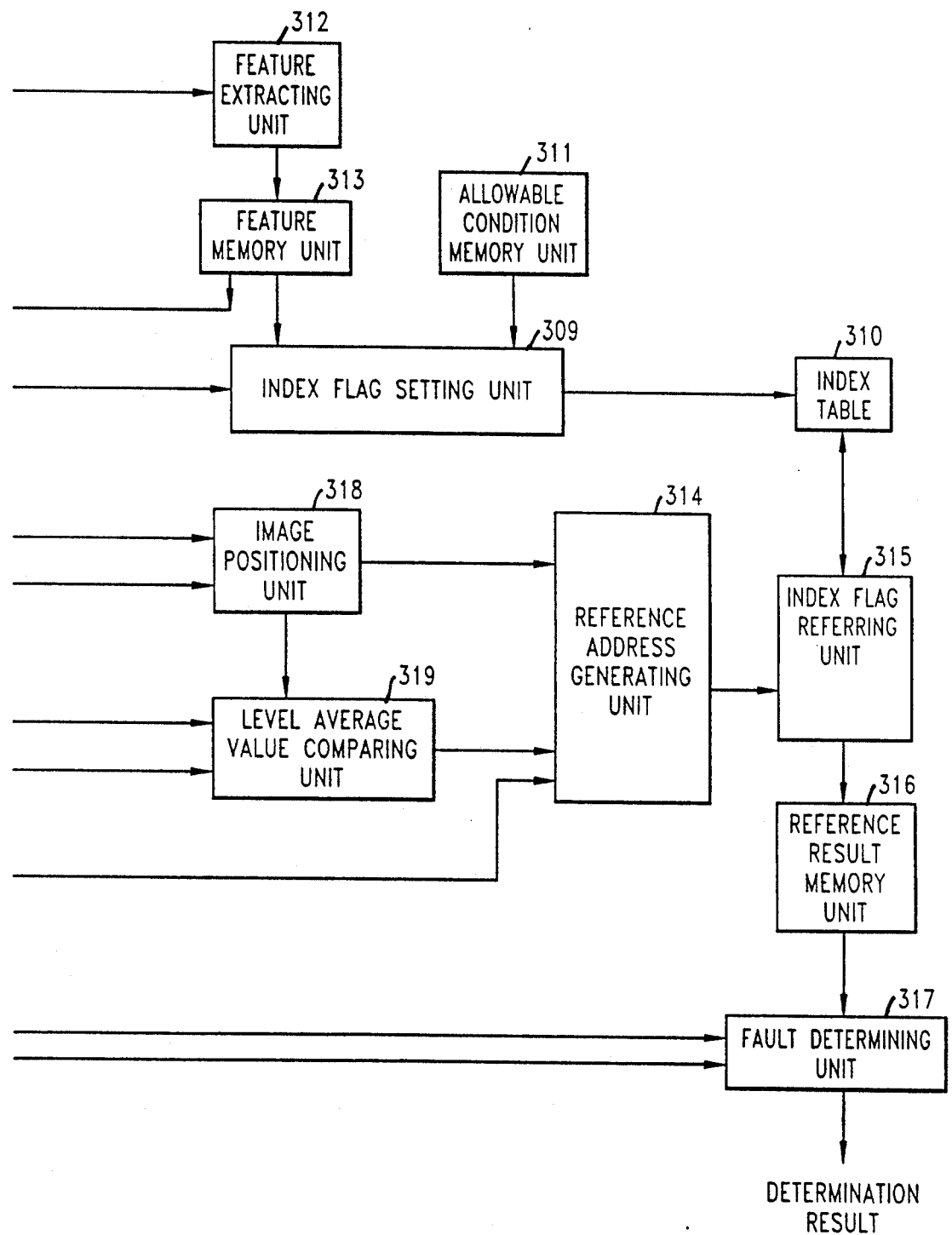

A basic embodiment of a high-speed fault detecting apparatus for executing the above fault detecting method will be described below with reference to a block diagram shown in FIG. 16.

In response to a start signal 302, an image input unit 303 receives an image signal 301 from a camera of an imaging system. An A/D converter of the image input unit 303 converts the input analog signal of an image into a digital signal.

Since an imaging speed at the camera side differs from an image processing speed of an inspecting apparatus, input image data is normally stored in a buffer memory 304 and then supplied to the processing side at a speed at which the apparatus can operate.

A pre-processing unit 305 performs processing for converting the input image data into image data suitable for inspection. For example, in order to correct an image level variation caused by variations in elements or non-uniform illumination conditions, or to perform inspection corresponding to human visual characteristics, a calculation considering a Mach effect for allowing an image to be more suitable for human visual characteristics, or various filtering calculations such as smoothing processing are performed. A selector 306 is a switch for switching a destination of an image signal. When a reference image is to be input, a reference image memory unit 307 is selected. When an inspection image is to be input, an input image memory unit 308 is selected.

Reference image data serving as a reference of inspection is stored in the reference image memory unit 307. In order to form a pattern equivalent to the reference image in an index space, X and Y coordinate values and a level value of each pixel are obtained by an index flag setting unit 309, and a corresponding flag in an index table 310 is turned on in accordance with these values. An allowable range is then set. A variation allowable amount corresponding to a mechanical positional difference upon inputting of an image or a color level is set and stored beforehand in an allowable condition memory unit 311. In order to perform inspection in accordance with a graphic pattern or an area, a feature extracting unit 312 extracts a feature of an image, and a feature memory unit 313 stores a feature amount. An allowable condition value corresponding to an intensity of the feature amount of the image is already set in the allowable condition memory unit 311. The index flag setting unit 309 fetches the allowable conditions corresponding to a color or level of a pixel and allowable conditions corresponding to the intensity of the feature amount (difference in graphic patterns or the like) of the image for each of a pixel of the reference image data stored in the reference image memory 307 and performs ON-flag propagation processing for a flag in the index table 310 in accordance with the conditions. In this manner, a reference pattern is formed in the index table 310.

After reference pattern formation is performed as pre-processing, image data to be inspected is supplied from the imaging system. The selector 306 is switched to the input image memory unit 308, and data of the image to be inspected is supplied to the input image memory unit 308 through the same path and pre-processing as the reference image.

A reference address generating unit 314 generates an address of the index table 310 to be referred to. In accordance with the generated address, an index flag referring unit 315 refers to the index table 310, and a reference result memory unit 316 stores a value of the referred flag. Finally, on the basis of obtained flag reference results of all pixels, a fault determining unit 317 checks whether the input image data is normal or defective. For example, areas of defective pixels obtained by the reference result memory unit 316 are measured. If the measured area exceeds a threshold value, a fault is determined. In addition, in order to use level values of the reference image, feature amounts of the image and the like in total determination, the data in the reference image memory unit 307 and the feature memory unit 313 can be used to perform determination.

In order to improve an inspection precision, it is preferred to minimize a mechanical positional difference. For this purpose, an image positioning unit 318 for positioning an input image with a reference image may be added as a circuit of the inspecting apparatus before the index table 310. The image positioning unit 318 calculates a difference between graphic patterns of a reference image in the reference image memory unit 307 and an image to be inspected in the input image memory unit 308 for each predetermined area and outputs difference amounts of coordinates of a corresponding pixel. In this case, a level value of each pixel is directrly supplied to the reference address generating unit 314, its X and Y coordinate values, on the other hand, are corrected by correction amounts obtained by the image positioning unit 318 and then supplied to the reference address generating unit 314.

In actual inspection, even if images to be inspected have small level differences, a normality is sometimes determined when a color within a certain area is uniform. For example, assuming that data represents a graphic pattern of blue sky, even if the blue is different more or less in images to be inspected, a normality is determined when the sky pattern is uniform. In this case, some pixels whose levels differences are small must be determined to be defective as abnormal level pixels because their surrounding portion is uniform. However, when a level variation allowable amount is set to allow a difference between levels, those pixels are sometimes determined to be normal. In order to prevent this, a level average value comparing unit 319 for comparing level average values of an input image and a reference image for an area in which a level is uniform may be added to the apparatus. The level average value comparing unit 319 compares an average value of levels in a predetermined area of a reference image in the reference image memory unit 307 with that in a corresponding area of an image to be inspected in the input image memory unit 308 to calculate a level difference between the average values, corrects a level value of each pixel of the input image by an amount of the calculated level difference, and supplies the corrected values to the reference address generating unit 314. In order to position the reference image with the input image beforehand, difference amounts of the X and Y coordinate values are received from the image positioning unit 318, and X and Y coordinate values of an area in the input image in which an average value is to be calculated are corrected in accordance with the image difference amounts.

All the processing blocks of the fault detecting apparatus are controlled by a control unit 320. (Referring to FIG. 16, connections between the control unit 320 and the respective blocks are indicated by arrows for the sake of simplicity of the drawing.)

When a hierarchical structure is used as an index space, the index flag setting unit 309, the index table 310, the reference address generating unit 314 and the index flag referring unit 315 are arranged for the hierarchical structure. In order to form a reference pattern in the index space in accordance with a level value of each pixel in the reference image, the index flag setting unit 309 generates addresses of flags to be turned on in each hierarchical table in the index table 310 on the basis of level values of pixels. The index flag setting unit 309 performs flag setting processing for the hierarchical tables in the index table 310, thereby forming a reference pattern. Subsequently, in order to set an allowable range, the index flag setting unit 309 sets a flag propagation amount corresponding to allowable conditions, and then ON-flag propagation processing is performed for the index table 310 having the hierarchical structure.

Inspection processing is performed as follows. That is, the reference address generating unit 314 generates a reference address of a flag to be referred to in each hierarchical level in the index table 310 on the basis of input X and Y coordinate values and a level value and supplies the reference address in a first hierarchical table to the index flag referring unit 315. The index flag referring unit 315 refers to a corresponding flag in the first hierarchical table of the index table 310 and obtains a flag value. If the flag value represents a fault, the index flag referring unit 315 supplies this result to the reference result memory unit 316, thereby ending inspection of the pixel. If the flag value represents normal data, the index flag referring unit 315 generates an address in a second hierarchical table to be referred to next and at the same time receives a reference address in the second hierarchical table from the reference address generating unit 314, and then refers to a corresponding flag in the second hierarchical table in the index table 310, thereby obtaining a flag value. This processing is repeatedly performed down to the lowest level. In the lowest level, regardless of whether a value of a referred flag represents a normality or fault, the reference result is supplied to the reference result memory unit 316.

Figure 17:
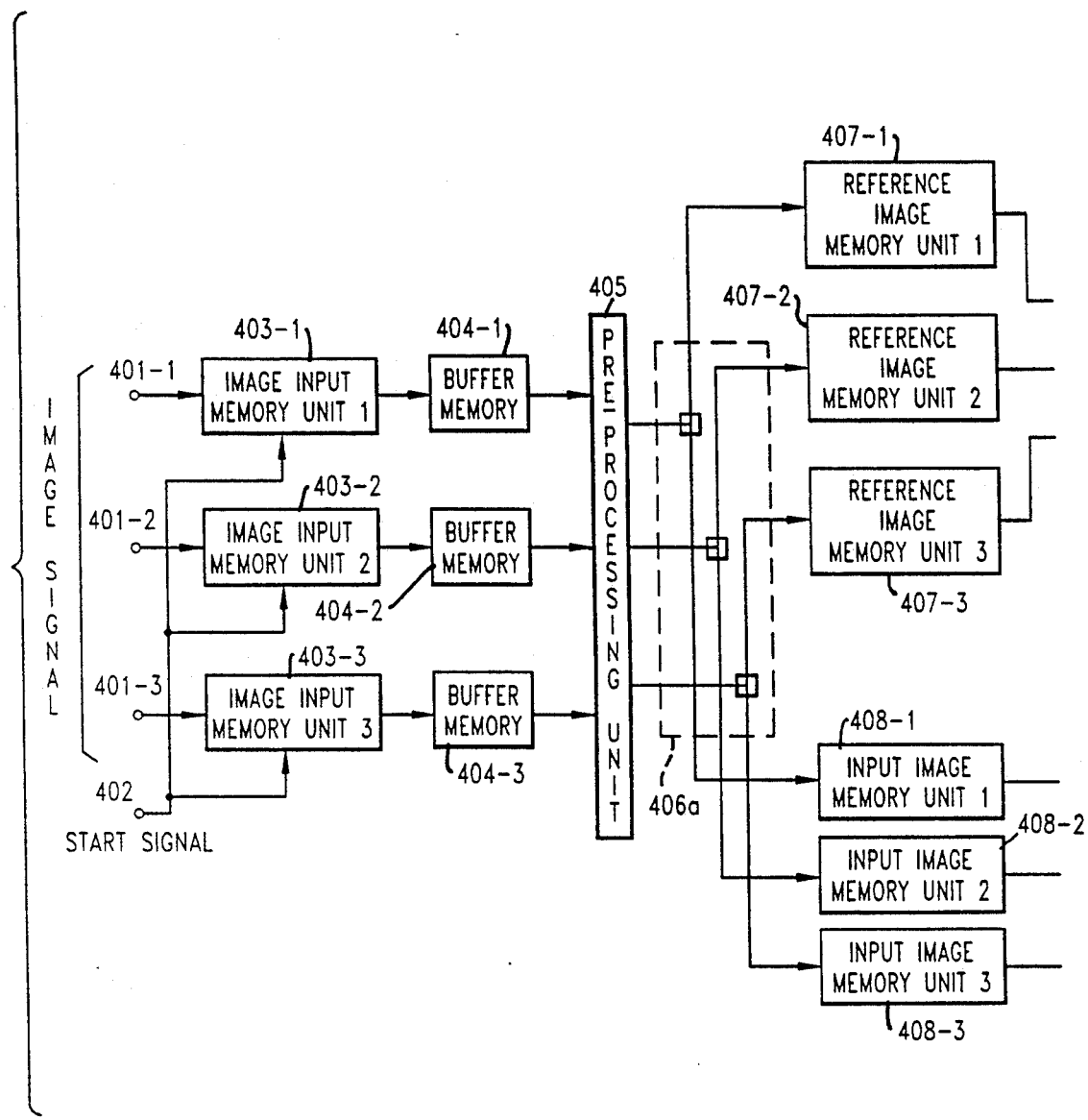
FIG. 17 is a block diagram showing another embodiment of a high-speed fault detecting apparatus in which three image signals are input and index tables are independently used.
Figure 17:
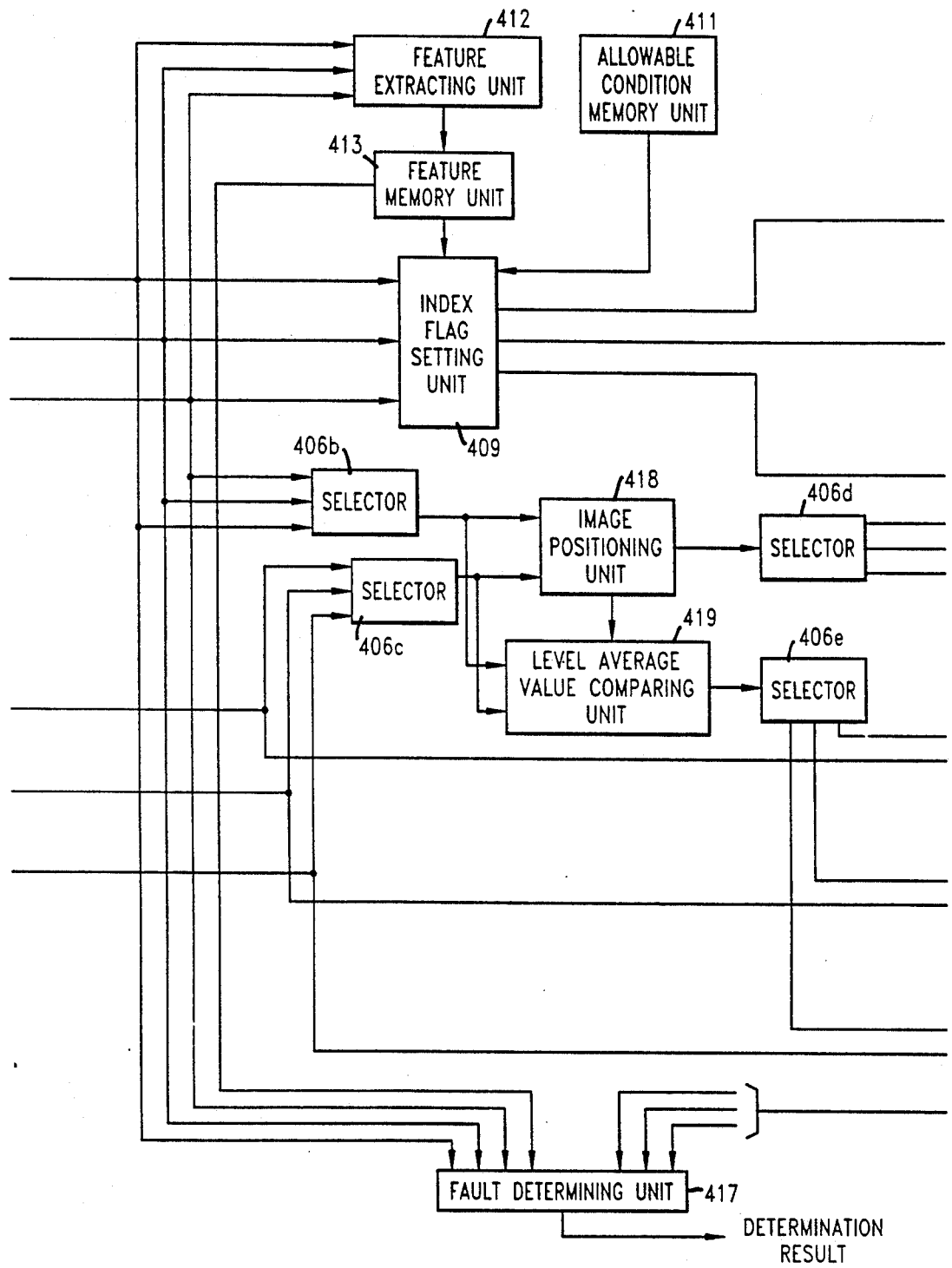
Figure 17:
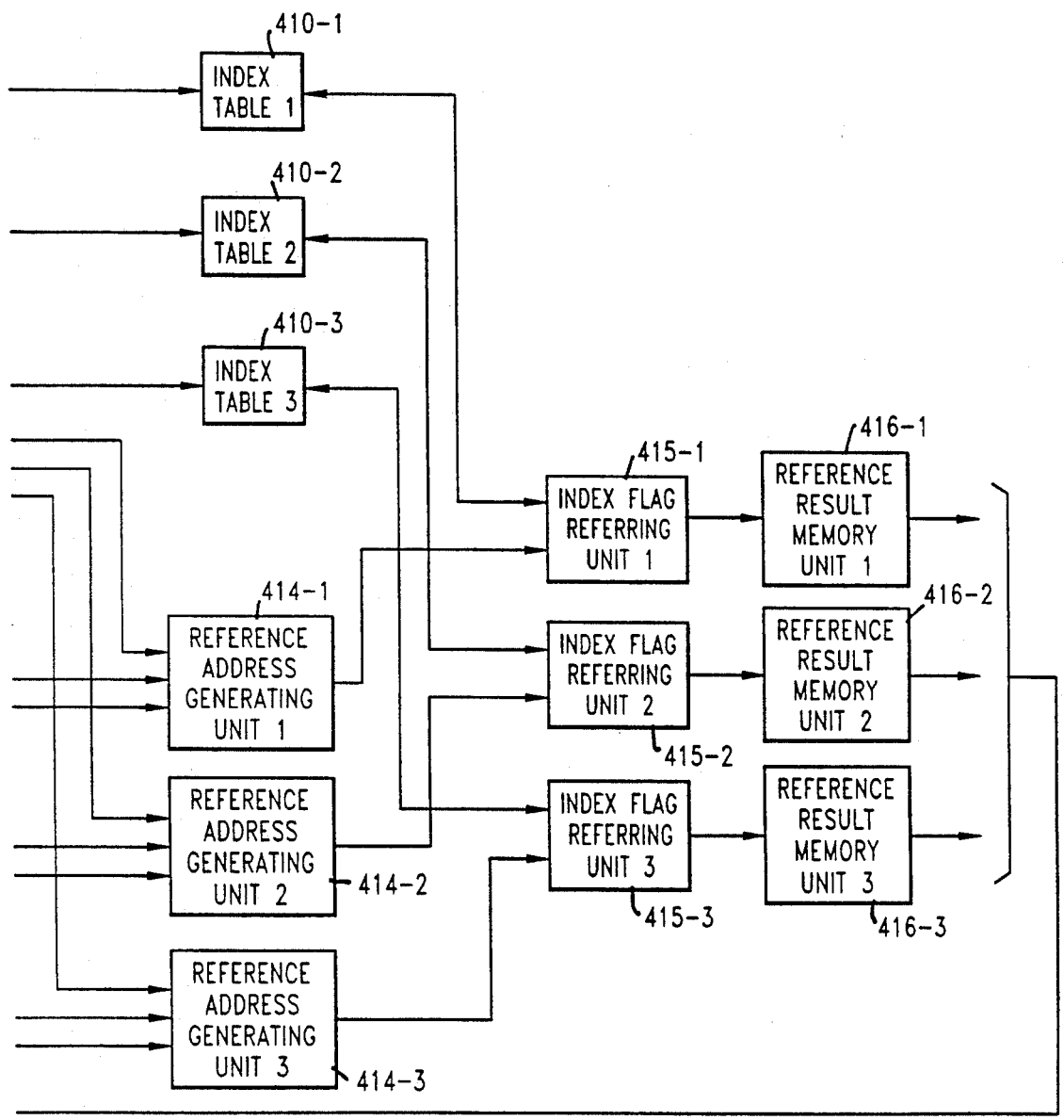

FIG. 17 is a block diagram of another embodiment of the fault detecting apparatus in which the number of input image signals is three as in the case of a color image and three index tables are independently provided for three types of image data. In this embodiment, the number of each of the following blocks is three: image input units 403-1 to 403-3; buffer memories 404-1 to 404-3; reference image memory units 407-1 to 407-3; input image memory units 408-1 to 408-3; index tables 410-1 to 410-3; reference address generating units 414-1 to 414-3; index flag referring units 415-1 to 415-3; and reference result memory units 416-1 to 416-3.

A pre-processing unit 405 may also have a three-block arrangement. However, in order to convert R, G and B signals into other color image signals (Y, I and Q or the like), processing must be performed using three types of image signals. Therefore, only one block of the pre-processing unit 405 is used.

A selector 406a is a switch for switching a signal propagation direction in accordance with whether a reference image or an image to be inspected is to be input. Selectors 406b, 406c, 406d and 406e are switches for selecting one of three signals in order to compare the same type of images when image positioning and level average value comparing processing are to be performed.

Industrial Applicability

As has been described above, the fault inspecting method and apparatus according to the present invention are effective as a method and apparatus for automatically detecting and determining a fault of data of image data input by a camera and different from a reference image at high speed and especially suitable for use in appearance inspection of a printed image. That is, (1) By using pixel data as an index for referring to a flag, a pixel can be compared and determined with respect to a reference image by performing an index space referring operation once for each pixel. Therefore, inspection can be performed at high speed several tens of times those of conventional techniques in terms of only the number of memory accesses.

(2) Since setting of determination references can be performed as pre-processing independently of inspection, a positional difference allowable amount of a level variation allowable amount can be differently set for each pixel in accordance with a graphic pattern of a printed image. Therefore, a variety of complicated determination references can be flexibly set, while the conventional techniques cannot perform such setting because an inspection speed is reduced.

We claim:

1. In automatic comparative inspection of a printed color image having a plurality of gray scale levels of a number that can express full color values, a high-speed method for detecting fault generated in the printed image, said method comprising the steps of:

forming a reference image having a plurality of pixels, preparing a table, which forms an index space, constituted by three axes including x- and y-coordinate axes of the reference image and an axis for a color number value having a multitude of flags corresponding in number to colors that can be assumed by each pixel of the reference image, and activating, for each pixel of the reference image, a base flag in the table having a three-dimensional address based on the coordinates of said pixel of the reference image and its color number value;

establishing, as a degree of conformance with respect to the values corresponding to the three-dimensional address of said base flag, an evaluation value based on the values of said base flag, of each of the flags around said base flag along the x- and y-axes, and of each of the flags around said base flag along the color axis; and determining for each pixel in the image to be inspected the three-dimensional address of said pixel based on coordinate values and color number value of said pixel, and comparing the values of each pixel of the inspected image with the values of the corresponding pixel of the reference image and establishing that correspondence between each of the pixels in the reference image with each of the pixels in the inspected image is achieved when the values of the inspected pixels deviate from the values of the reference pixels by amounts falling within a preset threshold.

2. A method according to claim 1, comprising expressing the colors of the pixels of the image by a plurality of color signal components, preparing index spaces corresponding in number to the color signal components and wherein the index spaces of respective color components are defined as tables having flags corresponding in number to levels that can be assumed by the reference image, and during inspection, comparing respective color components in units of color components, and evaluating correspondence between the pixels of the reference image and the inspected image based on a total of all the color components by using pixel comparisons corresponding in number to the color components.

3. A method according to claim 2, comprising matching a single flag with a plurality of adjacent attribute values represented by the coordinate values and the color number value or level value in said index space.

4. A method according to claim 2, wherein, the index space is defined as an N-dimensional table constituted by N axes, the N-dimensional table is divided by $M_i$ (i=1, 2, ..., N) with respect to the ith dimensional axis to form $M_1$ x $M_2$ x ... x $M_N$ small multidimensional tables, and when a flag having an evaluation value other than "0" is included in any one of said small multidimensional tables, this small multidimensional table is further divided into smaller multidimensional tables, and when all of said small multidimensional tables have flags of evaluation value "0", division is not performed thereafter.

5. A method according to claim 4, comprising sequentially performing the operation of reference to the flag of the index space in accordance with the three-dimensional address which is obtained on the basis of the coordinate values and the color number value of each pixel of the inspected image from a high-order multidimensional table to a low-order multidimensional table.

6. A method according to claim 4, comprising sequentially performing the operation of reference to the flag of the index space in accordance with the three-dimensional address which is obtained on the basis of the coordinate values and the level value of each pixel of the inspected image from a high-order multidimensional table to a low-order multidimensional table.

7. A method according to claim 1, comprising storing the determined values of each result of reference to the flag value of the pixel of the inspected image in a reference result table as an evaluation value in units of pixels, and effecting inspection determination based on the evaluation values and the number of pixels that have these evaluation values.

8. A method according to claim 1, including the step of preparing, for all the reference images, a plurality of frames of reference images and setting as the base flag of the table, the flag having the three-dimensional address which is obtained on the basis of the coordinate values and the color number value or level value of each pixel.

9. A high-speed fault detecting apparatus comprising:

image reading means for reading a reference image and an image to be inspected;

image memory means for storing the reference image and the image to be inspected, respectively;

an index space for storing a flag defining an evaluation value of an attribute value in which coordinate values and a color number value of the image are associated;

an allowable condition memory means for storing an amount of allowable variation of the image and an allowable variation amount based on an inspection reference;

an index flag setting means for setting the evaluation value in each of the flags of the index space on the basis of the coordinate values and the color number value of each pixel of the reference image;

referring means for reading a value of a corresponding flag in the index space on the basis of the coordinate values and the color number value of the image to be inspected; and a fault determination processing means for determining the presence or absence of a fault on the basis of a reference result.

10. A high-speed fault detecting method comprising the steps of:
(a) preparing, for each pixel of a reference image, a table including a multitude of flags in a number corresponding to the number of levels of the pixel;
(b) assigning a value to a flag corresponding to an actual level of the pixel in each table; and
(c) comparing a level value of each pixel of an image to be inspected with a table of a corresponding pixel prepared for the reference image, and when a flag corresponding to the level value of the pixel of the image to be inspected does not deviate, within limits, of the level value of the reference image, determining that no fault is present in the pixel to be inspected, said reference image being a color image, a table for each color signal component being prepared for each pixel, said table for each color signal component being compared with the image to be inspected.

11. A method according to claim 10 wherein an N-dimensional table including N axes is divided by $M_n$ with respect to the nth dimensional axis to form $M_1$ x $M_2$ x . . . x $M_n$ small multidimensional tables, if an ON flag is included in any of said small multidimensional tables, this small multidimensional table is further divided into small multidimensional tables, and if no ON flag is included in any of said small multidimensional tables, division is not performed thereafter.

12. A method according to claim 11 wherein comparison between a pixel level value of each pixel of the image to be inspected and each multidimensional table prepared for the reference image is sequentially performed from upper multidimensional tables to lower multidimensional tables.

13. A method according to claim 10 wherein a value of each flag is a numeral.

14. A method according to claim 10 wherein a single table is prepared for a plurality of pixels of the reference image.

15. A method according to claim 10 wherein a flag is prepared for each of a plurality of levels of each pixel of the reference image.

16. A high-speed fault detecting method comprising the steps of:
(a) preparing, for each pixel of a reference image, a table including a multitude of flags in a number corresponding to the number of levels of the pixel;
(b) assigning a value to a flag corresponding to a level value of the pixel and to flags corresponding to levels falling within an allowable range of a reference level of the pixel;
(c) assigning values to flags corresponding to levels at adjacent coordinate points within a range corresponding to an allowable positional difference amount; and
(d) comparing a level value of each pixel of an image to be inspected with a table of a corresponding pixel prepared for the reference image, and when a flag corresponding to the level value of the pixel of the image to be inspected does not deviate, within limits, of the level value of the reference image, determining that no fault is present in the pixel to be inspected, said reference image being a color image, a multidimensional table including axes corresponding to the number of color signal components being prepared for each pixel, said multidimensional table being compared with the image to be inspected.

17. A method according to claim 16 wherein an N-dimensional table including N axes is divided by $M_n$ with respect to the nth dimensional axis to form $M_1$ x $M_2$ x . . . x $M_n$ small multidimensional tables, and when an ON flag is included in any of said small multidimensional tables, this small multidimensional table is further divided into small multidimensional tables, and when no ON flag is included in any of said small multidimensional tables, division is not performed thereafter.

18. A method according to claim 16 wherein a value of each flag is a numeral.

19. A method according to claim 16 wherein a single table is prepared for a plurality of pixels of the reference image.

20. A method according to claim 16 wherein a flag is prepared for each of a plurality of levels of each pixel of the reference image.

21. A high speed fault detecting apparatus comprising:

image reading means for reading a reference image and an image to be inspected;

image memory means for storing the reference image and the image to be inspected, respectively;

an index space for storing a flag defining an evaluation value of an attribute value in which coordinate values and a level value of the image are associated;

an allowable condition memory means for storing an amount of allowable variation of the image and an allowable variation amount based on an inspection reference;

an index flag setting means for setting the evaluation value in each of the flags of the index space on the basis of the coordinate values and the level value of each pixel of the reference image;

referring means for reading a value of a corresponding flag in the index space on the basis of the coordinate values and the level value of the image to be inspected;

a fault determination processing means for determining the presence or absence of a fault on the basis of a reference result.

* * * * *